US012598275B2

(12) United States Patent
Lakshminarayanan

(10) Patent No.:  US 12,598,275 B2
(45) Date of Patent:        Apr. 7, 2026

(54) DISPLAY CONTROLLER WITH CONTENT-ADAPTIVE MODULATION CONTROL SIGNALING

(71) Applicant: TEXAS INSTRUMENTS INCORPORATED, Dallas, TX (US)

(72) Inventor: Aravind Lakshminarayanan, Frisco, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/524,330

(22) Filed: Nov. 30, 2023

(65) Prior Publication Data

US 2024/0179276 A1      May 30, 2024

Related U.S. Application Data

(60) Provisional application No. 63/385,594, filed on Nov. 30, 2022.

(51) Int. Cl.
| | |
|---|---|
| *G09G 3/20* | (2006.01) |
| *G03B 21/00* | (2006.01) |
| *H04N 9/31* | (2006.01) |
| *G02B 26/08* | (2006.01) |

(52) U.S. Cl.
CPC ......... *H04N 9/3126* (2013.01); *G03B 21/008* (2013.01); *G09G 3/2018* (2013.01); *H04N 9/3155* (2013.01); *G02B 26/0833* (2013.01)

(58) Field of Classification Search
CPC .. H04N 9/3126; H04N 9/3155; G03B 21/008; G09G 3/2018; G02B 26/0833
See application file for complete search history.

(56) References Cited

U.S. PATENT DOCUMENTS

| | | | | | |
|---|---|---|---|---|---|
| 6,008,785 | A | * | 12/1999 | Hewlett | G09G 3/346 345/48 |
| 8,269,881 | B2 | * | 9/2012 | Neil | H04N 23/70 348/289 |
| 8,531,493 | B2 | * | 9/2013 | Hui | G09G 3/2022 345/691 |
| 9,930,303 | B1 | * | 3/2018 | Morgan | H04N 9/3111 |
| 10,708,624 | B1 | * | 7/2020 | Saeedi | H04N 19/50 |
| 2009/0091713 | A1 | * | 4/2009 | Shirai | G09G 3/002 359/291 |
| 2009/0190045 | A1 | * | 7/2009 | Endo | H04N 9/3114 348/760 |

(Continued)

*Primary Examiner* — Sejoon Ahn
(74) *Attorney, Agent, or Firm* — Michael T. Gabrik; Frank D. Cimino

(57) ABSTRACT

A system includes: a spatial light modulator including pixel elements; and a controller coupled to the spatial light modulator. The spatial light modulator sets the pixel elements based on a modulation control signal. The controller is configured to: obtain an image; analyze the image to determine image attributes including a dynamic range metric; provide a control sequence responsive to the determined image attributes; and provide the modulation control signal to the spatial light modulator based on the control sequence. The modulation control signal reduces a number of bits used by the pixel elements relative to a default number of bits if the dynamic range metric is below a dynamic range threshold.

20 Claims, 14 Drawing Sheets

(56) References Cited

U.S. PATENT DOCUMENTS

| | | | |
|---|---|---|---|
| 2009/0262413 A1* | 10/2009 | Bartlett | G02B 6/356 |
| | | | 359/291 |
| 2018/0199014 A1* | 7/2018 | Morgan | H04N 9/3123 |
| 2019/0066587 A1* | 2/2019 | Han | H10D 86/60 |
| 2019/0361325 A1* | 11/2019 | Pertierra | G02B 5/20 |
| 2020/0184894 A1* | 6/2020 | Shi | G09G 3/32 |
| 2021/0072553 A1* | 3/2021 | Danziger | H04N 9/3105 |
| 2022/0351664 A1 | 11/2022 | Lakshminarayanan et al. | |

* cited by examiner

FIG. 3

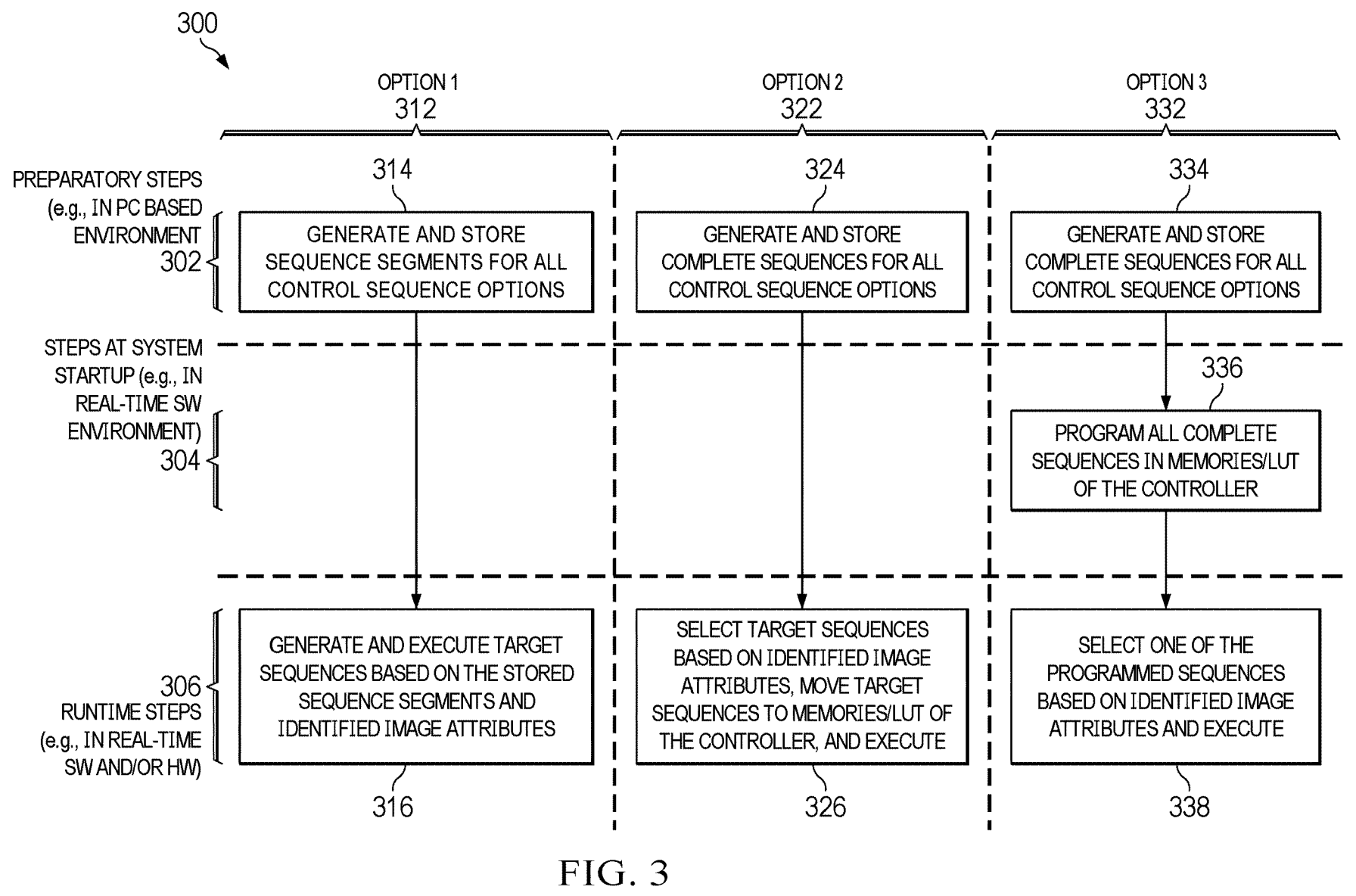

OPTION 3
332

334

GENERATE AND STORE COMPLETE SEQUENCES FOR ALL CONTROL SEQUENCE OPTIONS

336

PROGRAM ALL COMPLETE SEQUENCES IN MEMORIES/LUT OF THE CONTROLLER

SELECT ONE OF THE PROGRAMMED SEQUENCES BASED ON IDENTIFIED IMAGE ATTRIBUTES AND EXECUTE

338

OPTION 2
322

324

GENERATE AND STORE COMPLETE SEQUENCES FOR ALL CONTROL SEQUENCE OPTIONS

SELECT TARGET SEQUENCES BASED ON IDENTIFIED IMAGE ATTRIBUTES, MOVE TARGET SEQUENCES TO MEMORIES/LUT OF THE CONTROLLER, AND EXECUTE

326

OPTION 1
312

314

GENERATE AND STORE SEQUENCE SEGMENTS FOR ALL CONTROL SEQUENCE OPTIONS

GENERATE AND EXECUTE TARGET SEQUENCES BASED ON THE STORED SEQUENCE SEGMENTS AND IDENTIFIED IMAGE ATTRIBUTES

316

300

PREPARATORY STEPS (e.g., IN PC BASED ENVIRONMENT) 302

STEPS AT SYSTEM STARTUP (e.g., IN REAL-TIME SW ENVIRONMENT) 304

RUNTIME STEPS (e.g., IN REAL-TIME SW AND/OR HW) 306

600

610

1000

1002 — OBTAIN AN IMAGE

1004 — ANALYZE THE IMAGE TO IDENTIFY IMAGE ATTRIBUTES

1006 — PRODUCE A CONTROL SEQUENCE BASED ON THE IDENTIFIED IMAGE ATTRIBUTES

1008 — PROVIDE A MODULATION CONTROL SIGNAL TO A SPATIAL LIGHT MODULATOR AND AN ILLUMINATION CONTROL SIGNAL TO A LIGHT SOURCE BASED ON THE CONTROL SEQUENCE

DISPLAY CONTROLLER WITH CONTENT-ADAPTIVE MODULATION CONTROL SIGNALING

CROSS REFERENCE TO RELATED APPLICATION

The present application claims priority to U.S. Provisional Application No. 63/385,594, titled "SYSTEM AND METHOD FOR CONTENT-ADAPTIVE PWM SEQUENCING IN ULTRA LOW POWER DISPLAYS", filed on Nov. 30, 2022, which is hereby incorporated by reference in its entirety.

BACKGROUND

Modern displays include a light source, a spatial light modulator, and a controller. The controller provides synchronized controls signals for the light source and the spatial light modulator. Reducing power consumption of displays is an ongoing challenge. For example, reducing the power consumption of mobile displays, such as augmented reality (AR) displays or virtual reality (VR) displays, may be used to extend the battery life of such mobile displays.

SUMMARY

In an example, a system comprises: a spatial light modulator including pixel elements; and a controller coupled to the spatial light modulator. The spatial light modulator sets the pixel elements based on a modulation control signal. The controller is configured to: obtain an image; analyze the image to determine image attributes including a dynamic range metric; provide a control sequence responsive to the determined image attributes; and provide the modulation control signal to the spatial light modulator based on the control sequence. The modulation control signal reduces a number of bits used by the pixel elements relative to a default number of bits if the dynamic range metric is below a dynamic range threshold.

In another example, a method comprises: obtaining, by a controller, an image; analyzing, by the controller, the image to determine image attributes including a peripheral content metric; and providing, by the controller, a modulation control signal responsive to the determined image attributes, the modulation control signal excluding reset blocks for pixels elements of a spatial light modulator if the peripheral content metric is below a peripheral content threshold.

In yet another example, a device comprises a controller that includes hardware accelerators configured to: obtain an image; analyze the image to determine image attributes including a gradient metric; provide a control sequence responsive to the determined image attributes; and provide a modulation control signal based on the control sequence.

BRIEF DESCRIPTION OF THE DRAWINGS

FIG. 3 is a diagram showing control alternative control sequence management options in accordance with various examples.

DETAILED DESCRIPTION

Figure 1A:
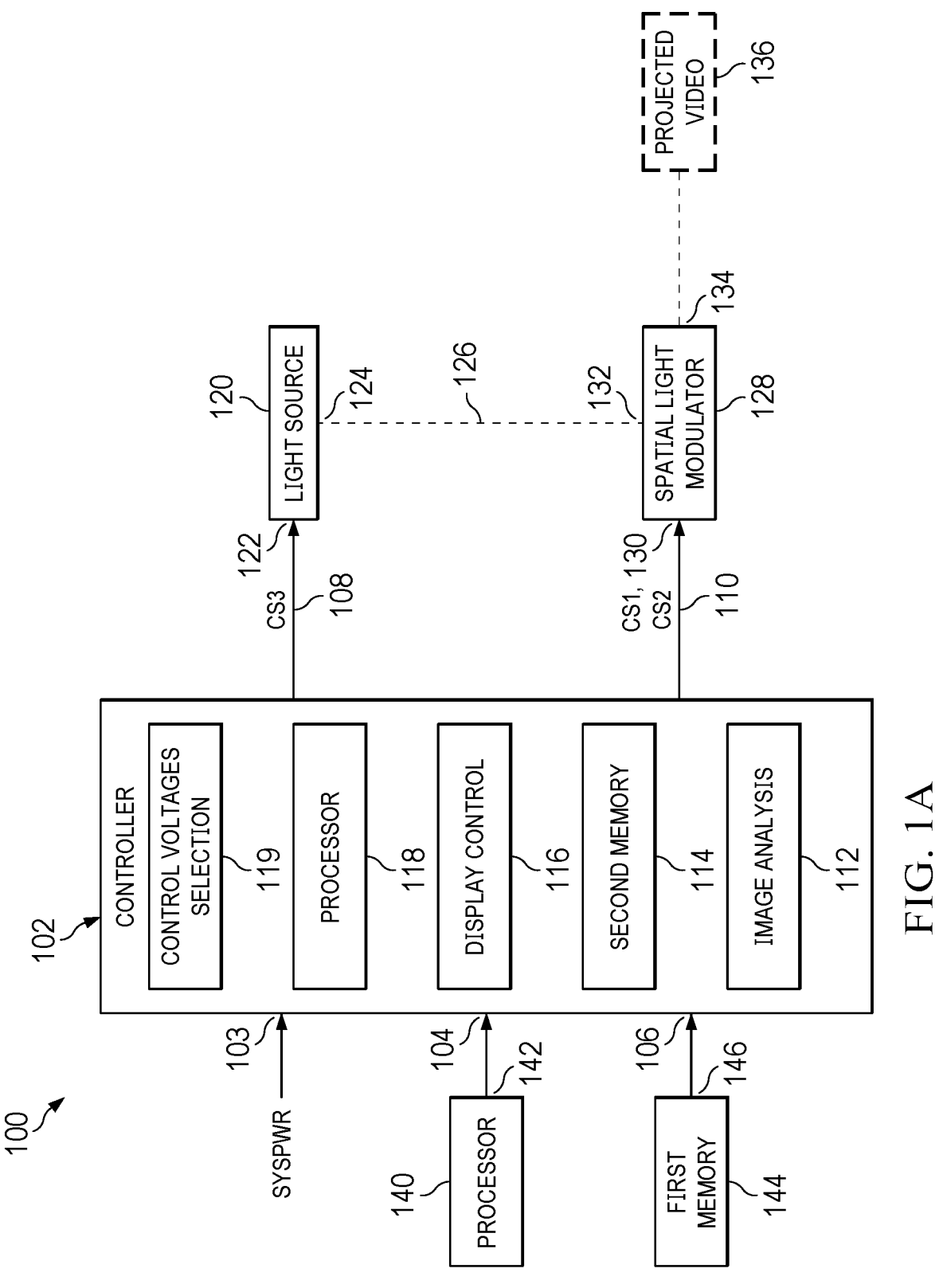
FIG. 1A is a diagram of a system in accordance with various examples.

The same reference numbers or other reference designators are used in the drawings to designate the same or similar features. Such features may be the same or similar either by function and/or structure.

In the described examples, a display controller (sometimes just controller hereafter) provides synchronized controls signals for a light source and a spatial light modulator. The controller may include one or more circuits. The circuits of a controller may be integrated circuits (ICs) or other circuits. In the described examples, the controller improves the efficiency of a display (reducing power consumption) by adjusting the controls signals for the light source and/or the spatial light modulator responsive to the image or content to be displayed. In some examples, the controller performs image analysis to identify image attributes and related opportunities to reduce power consumption. Example image attributes that may be identified by the controller include, but are not limited to, a dynamic range metric, a gradient metric, a pixel level metric (e.g., an average pixel level), a motion metric, a spatial distribution metric.

Responsive to the identified image attributes and a set of thresholds, ranges, and/or rules, the controller may adjust the control signals for the light source and/or the spatial light modulator. Example light source adjustments by the controller may include, but are not limited to, displayed colors, the number of color cycles, and/or the color ordering. Example spatial light modulator adjustments by the controller may include, but are not limited to, native bit depth, number of bits used, bit types, bit ordering, and/or spatial coverage (reset blocks). The figures hereafter provide additional details and example systems, controllers, and control options.

FIG. 1A is a block diagram of a system 100 in accordance with various examples. In some examples, system 100 is a projector, for example a traditional projector, an augmented reality (AR) display, a virtual reality (VR) display, a smart headlight, a heads-up display (HUD), an automotive ground projector, a light detection and ranging (LIDAR) unit, a lithography unit, a three-dimensional (3D) printer, a spectroscopy display, a 3D display, or another type of projector. The system 100 may also represent some or all of a display such as a digital micromirror device (DMD) display, a liquid crystal display (LCD), a light emitting diode (LED) display, a thin-film transistor (TFT) display, a liquid crystal on silicon (LCoS) display, or any other display.

The example system 100 is not intended to be limiting and the control techniques described herein may be used in any other system to adaptively reduce power consumption responsive to analysis and identification of image attributes as related power reduction options. As shown, system 100 includes a controller 102, a light source 120, a spatial light modulator (SLM) 128, a processor 140, and a first memory 144. The controller 102 has a first terminal 103, a second terminal 104, a third terminal 106, a fourth terminal 108, and a fifth terminal 110. The light source 120 has an input 122 and an optical output 124. The SLM 128 has an input 130, an optical input 132, and an optical output 134. The processor 140 has a terminal 142. The first memory 144 has a terminal 146.

In different examples, the SLM 128 may perform spatial modulation of light using mechanical, electro-optical, thermo-optical, and/or magneto-optical control options. In some SLM examples, microelectromechanical system (MEMS) components may be used. Example SLMs include, but are not limited to, a digital micromirror device (DMD), a phase light modulator (PLM), a liquid crystal on silicon (LCoS) device, a micro light-emitting diode (LED) device, or a liquid crystal display device. In some examples, the first memory 144 may include read-only-memory (ROM), random access memory (RAM), electrically erasable programmable read-only memory (EEPROM), flash memory, and/or other non-transitory computer readable memory types. In different examples, the first memory 144 may correspond to a single memory unit or multiple memory units.

In some examples, the processor 140 can be a central processing unit (CPU), a graphics processing unit (GPU), or a specialized processor programmed to perform image compression or decompression operations. In different examples, the processor 140 may include a processing pipeline, buffering, and control logic for performing image compression or decompression operations. Also, the processor 140 may include multiple processors, controllers, or engines to perform image compression or decompression operations. In one example, the processor 140 uses buffering and logic with a pipelined data path architecture to perform the image compression or decompression operations. Interleaving blocks in a single pipeline can present some limitations, as the single pipeline becomes a bandwidth bottleneck. Duplicating the pipeline increases bandwidth, but at the cost of logic area. In an example, the processing, buffering, and control logic are bundled into an image compression or decompression engine. A processing system may include multiple processing engines. The number of processing engines and an interleaving factor can be varied to ensure that an available compression bandwidth is in line with the compression bandwidth used by the compression tasks being performed. As used herein, "interleaving factor" refers to the number of processing queues and related stages of pipelined hardware for a processing engine. When queuing blocks of an image for compression operations, multiple blocks of the image are processed through different stages of the pipelined hardware of a processing engine in a manner that reduces the amount of waiting time for each processing stage and improves the overall processing speed relative to processing one block at a time. In one example, eight processing engines could be used, with each processing engine interleaving 32 blocks. In this example, the interleaving factor is 32. In other examples, the number of processing engines and the interleaving factor may vary. Without limitation, the number of processing engines may be two, four, six, eight, ten, or another integer number of processing engines. Without limitation, the interleaving factor may be two, four, eight, sixteen, or another integer number.

In the example of FIG. 1A, the controller 102 includes image analysis circuitry 112, a second memory 114, display control circuitry 116, a processor 118, and control voltages selection circuitry 119. In some examples, the image analysis circuitry 112 may include hardware accelerators configured to perform image analysis and compare determined image attribute metrics to related thresholds. In some examples, the second memory 114 may include ROM, RAM, EEPROM, flash memory, and/or other non-transitory computer readable memory types. In different examples, the second memory 114 may store a previously selected control sequence, all control sequence options, or control sequence segments. Storage of a selected control sequence, all control sequence options, or control sequence segments in the second memory 114 may occur before runtime of the controller 102 or during runtime of the controller 102.

In some examples, the display control circuitry 116 may include hardware accelerators configured to: receive image analysis results; and upload a control sequence from the first memory 144 to the second memory 114 during runtime of the controller 102 responsive to the image analysis results; and generate control signals (e.g., CS1 and CS2 for the SLM 128, and control signals to direct the control voltages selection circuitry 119) based on the uploaded control sequence. As another option, the display control circuitry 116 may include hardware accelerators configured to: receive image analysis results; select one of a plurality of control sequences stored in the second memory 114 (e.g., the control sequences stored in the second memory 114 before runtime of the controller 102) responsive to the image analysis results; and generate control signals (e.g., CS1 and CS2 for the SLM 128, and control signals to direct the control voltages selection circuitry 119) responsive to the selected control sequence. As another option, the display control circuitry 116 may include hardware accelerators configured to: receive image analysis results; select some of a plurality of control sequence segments stored in the second memory 114 (e.g., the control sequence segments stored in the second memory 114 before runtime of the controller 102) to generate a control sequence responsive to the image analysis results; and generate control signals (e.g., CS1 and CS2 for the SLM 128, and control signals to direct the control voltages selection circuitry 119) responsive to the generated control sequence. In some examples, the control signals generated by the display control circuitry 116 synchronize operations of the SLM 128, the light source 120, and possibly other elements (e.g., actuators, wobulators, etc.). In some examples, the display control circuitry 116 supports dynamic pixel shift of an image to improve the perceived resolution, and control of optical components (e.g., a color filter wheel) to create color components.

In some examples, the control voltages selection circuitry 119 may include adjustable voltage supplies to provide different control voltage options to the SLM 128, the light source 120, and possibly other active components (e.g., a color filter wheel, motion actuators, etc.) responsive to the control sequence selected or generated by the display control circuitry 116. In some examples, the display control circuitry 116 may provide control signals (e.g., CS4 in FIG. 1B or similar signals) to the control voltages selection circuitry 119 based on the control sequence rather than provide the control sequence itself to the control voltages selection circuitry 119.

In some examples, the processor 118 may include one or more processor cores or engines configured to adjust or limit operations of the image analysis circuitry 112, the display control circuitry 116, and/or the control voltage selection circuitry 119 responsive to user preferences or other configuration options. Example configuration or user preference options may include limiting or prioritizing the image attribute metrics to be used by the image analysis circuitry 112, adjusting thresholds to be used by the image analysis circuitry 112, limiting or adjusting control sequence options available for use by the display control circuitry 116, and accounting for configuration or user preference options such as color preferences or adjustments, power efficiency options, display frame rate adjustments, and/or other configuration or user preference options.

In some examples, the image analysis circuitry 112, the second memory 114, the display control circuitry 116, the processor 118, and the control voltage selection circuitry 119 operate at a rate that enables image analysis, control sequence selection/generation, providing appropriate control signals, and accounting configuration and user preference options to be completed for each image frame. In such examples, the individual and combined operations of the image analysis circuitry 112, the second memory 114, the display control circuitry 116, the processor 118, and the control voltage selection circuitry 119 are performed within an interval determined by the target display frame rate. In some examples, configuration or user preference adjustments may be performed at another rate or upon request.

As shown, the first terminal 103 of the controller 102 receives a supply voltage (SYSPWR). The supply voltage is provided, for example, by a voltage converter (not shown) such as an alternative-current to direct-current (AC/DC) converter and/or a direct-current to direct-current (DC/DC) converter. The second terminal 104 of the controller 102 is coupled to the terminal 142 of the processor 140. The third terminal 106 of the controller 102 is coupled to the terminal 146 of the first memory 144. The fourth terminal 108 of the controller 102 is coupled to the input 122 of the light source 120. The fifth terminal 110 of controller 102 is coupled to the input 130 of the SLM 128. The optical output 124 of the light source 120 is coupled to optical input 132 of the SLM 128. The optical output 134 of the SLM 128 provides a projected video 136.

In some examples, the controller 102 is configured to: receive SYSPWR at its first terminal 103 for ongoing power; receive images, video, and/or configuration data from the processor 140 at its second terminal 104; receive images, video, and/or configuration data from the first memory 144 at its third terminal 106; and store images, video, and/or configuration data in the second memory 114. In different examples, the second memory 114 may correspond to a single memory unit or multiple memory units. In some examples, the controller 102 is configured to: produce first control signals (CS1) responsive to available images, video, and/or configuration data (from the processor 140, from the first memory 144, and/or stored in the second memory 114), image analysis operations performed by the image analysis circuit, control sequence management operations performed by the display control circuitry 116, and SLM control signals selection operations performed by the processor 118; and provide CS1 at the fifth terminal 110 of the controller 102.

In some examples, the controller 102 is configured to: produce second control signals (CS2) responsive to available images, video, and/or configuration data (from the processor 140, from the first memory 144, and/or stored in the second memory 114), image analysis operations performed by the image analysis circuitry 112, control sequence management operations performed by the display control circuitry 116, and control voltages selection operations performed by the control voltages selection circuitry 119; and provide CS2 at the fifth terminal 110 of the controller 102. In some examples, CS2 includes SLM control voltages such as an offset voltage, a bias voltage, a reset voltage, a power supply voltage, and/or other SLM control voltages.

In some examples, the controller 102 is configured to: produce third control signals (CS3) responsive to images, video, configuration data (from the processor 140, from the first memory 144, and/or stored in the second memory 114), image analysis operations performed by the image analysis circuit, control sequence management operations performed by the display control circuitry 116, and control voltages selection operations performed by the control voltages selection circuitry 119; and provide CS3 at the fourth terminal 108 of the controller 102. In some examples, CS3 includes one or more control voltages for the light source 120 to control the intensity of light. For example, CS3 may include control voltages for red, green, and blue LEDs. Regardless of the particular lighting option used, the light source 120 is configured to provide light 126 at its optical output 124 responsive to CS3. In some examples, CS1 includes bit plane (BP) data and control signals (CTRL) to control light modulation options of the SLM 128. Without limitation, CS1 may be transferred to the SLM 128 using low-voltage differential signaling (LVDS).

In some examples, the image analysis operations of the image analysis circuitry 112 identifies one or more image attributes from images and/or videos provided by the processor 140 and/or the first memory 144. Without limitation, the analyzed image may be stored in a frame memory (not shown) at the time of analysis. Example image attributes include, but are not limited to, a dynamic range metric, a gradient metric, a pixel level metric, a motion metric, a spatial distribution of content metric, and a color metric. The dynamic range metric indicates the difference between the lightest pixel or color of an image and the darkest pixel or color of an image. The gradient metric indicates changes in the direction of intensity or luminosity of an image. The pixel level metric indicates an average pixel luminance level or other pixel metric for an image. The motion metric indicates an amount of motion in an image based on spatio-temporal content analysis applied observation blocks (e.g., group of pixels) and encoding parameters (e.g., quantization profile, spatial frequency, etc.) to be used in subsequent frames to quantify an extent of motion across frames. In some examples, motion compensation is varied across color cycles to reduce motion blur artifacts.

The spatial distribution of content metric indicates how content of image is distributed. For example, the spatial distribution of content metric may indicate whether the content of an image is evenly distributed or not evenly distributed. If not evenly distributed, the spatial distribution of content metric may indicate where the content is concentrated (e.g., in the center, to the left side, to the right side, to the top, to the bottom, around the edges, etc.). The color metric indicates one or more colors of an image. In some examples, the color metric indicates the prevalent color or colors of an image. In one example, the color metric indicates a percentage for each color or for a threshold number of colors (e.g., the 5 most prevalent colors) of an image. In different examples, the image attributes may be identified for each image frame, every other image frame, or another periodic analysis.

In some examples, image attributes such as dynamic range, shallow gradients, average pixel level, motion, spatial distribution of frame content, etc., are monitored on a per frame basis. Responsive to the image attributes, related metrics and/or related thresholds, characteristics of a control sequence are changed to optimize power consumption based on the above content attributes. Example characteristics of a control sequence that may be changed include: displayed colors; the number of color cycles and color ordering; the bit depth, the number of bits used, the bit types and ordering, spatial coverage on an SLM (e.g., reset blocks). In some examples, different "flavors" of unique sequence segments for a control sequence are generated and stored in memory. At run time, the individual sequence segments are stitched together to create a control sequence responsive to image attributes, related metrics and/or related thresholds. As another option, the entire control sequence may be stored and selectively used at run-time. In some examples, such control options work seamlessly with available SLM controllers as well as SLM controllers that support specialty compression techniques (e.g., sequence-on-the-fly). In some examples, the memory of some available SLM controllers may be increased to support the described control sequence techniques. As another option, image analysis and control sequence options may be simplified for use with an available SLM controller and memory configuration.

Table 1 shows example image attributes and related control sequence variations.

TABLE 1

| Se-quence Varia-tion | Image Attribute | | | | | |
|---|---|---|---|---|---|---|
| | Dynamic range | Shallow gradient | Content distribution | Peripheral Content | Hue Profile | Motion |
| # colors covered | Reduce colors if max = 0 | | | | Drop colors that are not needed | |
| Native bit depth | | Reduce bit depth based on content | | | | |
| # bits used | Reduce bits based on max value | | | | | |
| Color cycles | | | | Increase color cycles | | Increase color cycles |
| Covered reset blocks | | | Reduce reset blocks as appropriate | Stop updates blocks with no content | | |

In some examples, a control sequence based on the example of Table 1 may be adjusted so that: no data is displayed for colors that are not needed; the native bit depth of the control sequence is reduced responsive to a shallow gradient condition; the number of bits used for the control sequence is reduced responsive to the maximum value of dynamic range being below a threshold (e.g., a subset of an existing control sequence is used); the color cycles related to the control sequence may not display all frame content; and at least 1-bit of the control sequence uses the entire SLM for reliability.

In some examples, the control sequence management operations of the display control circuitry 116 produce a control sequence responsive to the one or more image attributes identified by the image analysis circuitry 112. In some examples, the control sequence is received by the processor 118 and is used to adjust CS1 and/or CS2 provided by the processor 118. In some examples, the control sequence may also be used by the control voltages selection circuitry 119 to adjust CS3 provided by the control voltages selection circuitry 119.

In other examples, the display control circuitry 116 may select a stored control sequence responsive to the one or more image attributes identified by the image analysis circuitry 112. For example, the display control circuitry 116 may direct the controller 102 to store different control sequence options in the second memory 114 before or during runtime of the controller 102. Without limitation, the control sequence options stored by the second memory 114 may be provided by the processor 140 or the first memory 144. During runtime of the controller, the display control circuitry 116 selects one of the control sequence options stored in the second memory 114 responsive to one or more image attributes identified by the image analysis circuitry 112.

In other examples, the display control circuitry 116 may assemble a control sequence from stored control sequence segments responsive to the one or more image attributes identified by the image analysis circuitry 112. For example, the display control circuitry 116 may direct the controller 102 to store different control sequence segments in the second memory 114 before or during runtime of the controller 102. Without limitation, the control sequence segments stored by the second memory 114 may be provided by the processor 140 or the first memory 144. During runtime of the controller, the display control circuitry 116 assembles a control sequence from the available control sequence segments stored in the second memory 114 responsive to one or more identified image attributes identified by the image analysis circuitry 112.

In some examples, the display control circuitry 116 is configured to: compare the image attributes identified by the image analysis circuitry 112 with predetermined thresholds to obtain comparison results; and produce, select, or assemble the control sequence responsive to the comparison results. For example, the dynamic range metric may be compared to a dynamic range threshold or thresholds. In some examples, the dynamic range metric may be a scaled value that varies between 0 and 1. If the dynamic range metric is identified to be below a threshold (e.g., near 0), the resulting control sequence may be used to adjust CS1 so that the number of bits (i.e., the bit depth) used by the SLM 128 is reduced relative to a default number of bits, and/or may be used adjust CS3 so that one or more colors of the light source 120 are not used. In some examples, the default number of bits used by the SLM 128 refers to the setting used for a previous image. In other examples, the default number of bits used by the SLM 128 refers to a predetermined number of bits used by the SLM 128 based on a user preference, a power setting configuration, and/or an image quality configuration.

As another example, the gradient metric may be compared to a gradient threshold or thresholds. In some examples, the gradient metric may be a scaled value that varies between 0 and 1. If the gradient metric is identified to be below a threshold (e.g., near 0), the resulting control sequence may be used to adjust CS1 so that the native bit depth used by the SLM 128 is reduced. In some examples, the default depth used by the SLM 128 refers to the setting used for a previous image. In other examples, the default bit depth used by the SLM 128 refers to a predetermined bit depth used by the SLM 128 based on a user preference, a power setting configuration, and/or an image quality configuration. In some examples, the gradient metric is a spatio-temporal gradient metric. As used herein, a "spatio-temporal gradient" refers to changes in the direction of intensity or luminosity within an image and/or changes in the direction of intensity or luminosity over multiple images.

As another example, the pixel level metric may be compared to a pixel level threshold or thresholds. In some examples, the pixel level metric may be a scaled value that varies between 0 and 1. If the pixel level metric is identified to be below a threshold (e.g., near 0), the resulting control sequence may be used to adjust CS1 so that the native bit depth of a display can be adapted to optimally display content while saving power.

As another example, the motion metric may be compared to a motion threshold or thresholds. In some examples, the motion metric may be a scaled value that varies between 0 and 1. If the motion metric is identified to be above a threshold (e.g., above 0.5), the resulting control sequence may be used to adjust CS1 and CS3 so that the number of color cycles increases relative to a default number of color cycles. In some examples, the default number of color used by the light source 120 and the SLM 128 refers to the setting used for a previous image. In other examples, the default number of color cycles used by the light source 120 and the SLM 128 refers to a predetermined number of color cycles used by the light source 120 and the SLM 128 based on a user preference, a power setting configuration, and/or an image quality configuration.

As another example, the spatial distribution of content metric may be compared to a spatial distribution of content threshold or thresholds. In some examples, the spatial distribution of content metric may be a scaled value that varies between 0 and 1, where 0 indicates centered content and 1 indicates peripheral content. If the spatial distribution of content metric is identified to be above a threshold (e.g., above 0.5), meaning most of the content is peripheral content, the resulting control sequence may be used to adjust CS1 and CS3 so that the number of color cycles increases relative to a default number of color cycles. As another option, if the spatial distribution of content metric is identified to be below a threshold (e.g., above 0.25), meaning most of the content is centered content, the resulting control sequence may be used to adjust CS1 to drop reset blocks related to peripheral content or other otherwise stop updating blocks with no content. In general, analysis of spatial distribution of content and related metrics can be used to identify which pixels or groups of pixels of an image can be omitted (e.g., by control of micromirrors or other SLM control options). As another example, the color metric may be compared to a color threshold or thresholds. If the color metric indicates some colors are not present, the resulting control sequence may be used to adjust CS3 to drop those colors.

In the example of FIG. 1A, the control sequence is used to produce CS1, CS2, and CS3. As another option, control signals based on the control sequence may be used to produce CS1, CS2, and CS3. In different scenarios, CS1 and/or CS2 may be provided to the SLM 128 to adjust native bit depth, number of bits used, bit types, bit ordering, spatial coverage (group of rows or columns), and/or other SLM parameters. Also, CS3 may be provided to the light source 120 to adjust displayed colors, the number of color cycles, the color ordering, and/or other light source parameters.

In some examples, the SLM 128 is configured to provide a projected video 136 responsive to the light 126, CS1, CS2, and CS3. In different examples, the processor 140, the first memory 144, the controller 102, the light source 120, and the SLM 128 are components of a single unit (e.g., a display unit). In other examples, individual components of the system 100 may be distributed into different units (e.g., a display unit, a lighting unit, a control unit, a video generation unit, a video compression unit, a video decompression unit, etc.). Regardless of the particular arrangement of the components for the system 100, the projected video may be based on compressed images and/or decompressed images. In some examples, the SLM 128 includes an LVDS interface or other signaling interface to receive control signals. Without limitation, the SLM 128 may include micromirrors and a two-dimensional array of memory cells. In some examples, the positive or negative deflection angle of micromirrors can be individually controlled by changing the address voltage of underlying memory addressing circuitry and micromirror reset signals (MBRST). In such examples, the SLM 128 receives CS1, CS2, and CS3 through one or more input interfaces and, responsive to CS1, CS2, and CS3, activates the controls which update the mechanical state of the micromirrors or the display state of pixels. Example SLM components are described in FIGS. 2A and 2B. In other examples, the SLM 128 may be a LCOS device, a PLM device, a micro-LED device, or a liquid crystal display device. For different SLM types, the control signals generated based on a control sequence may vary.

Figure 1B:
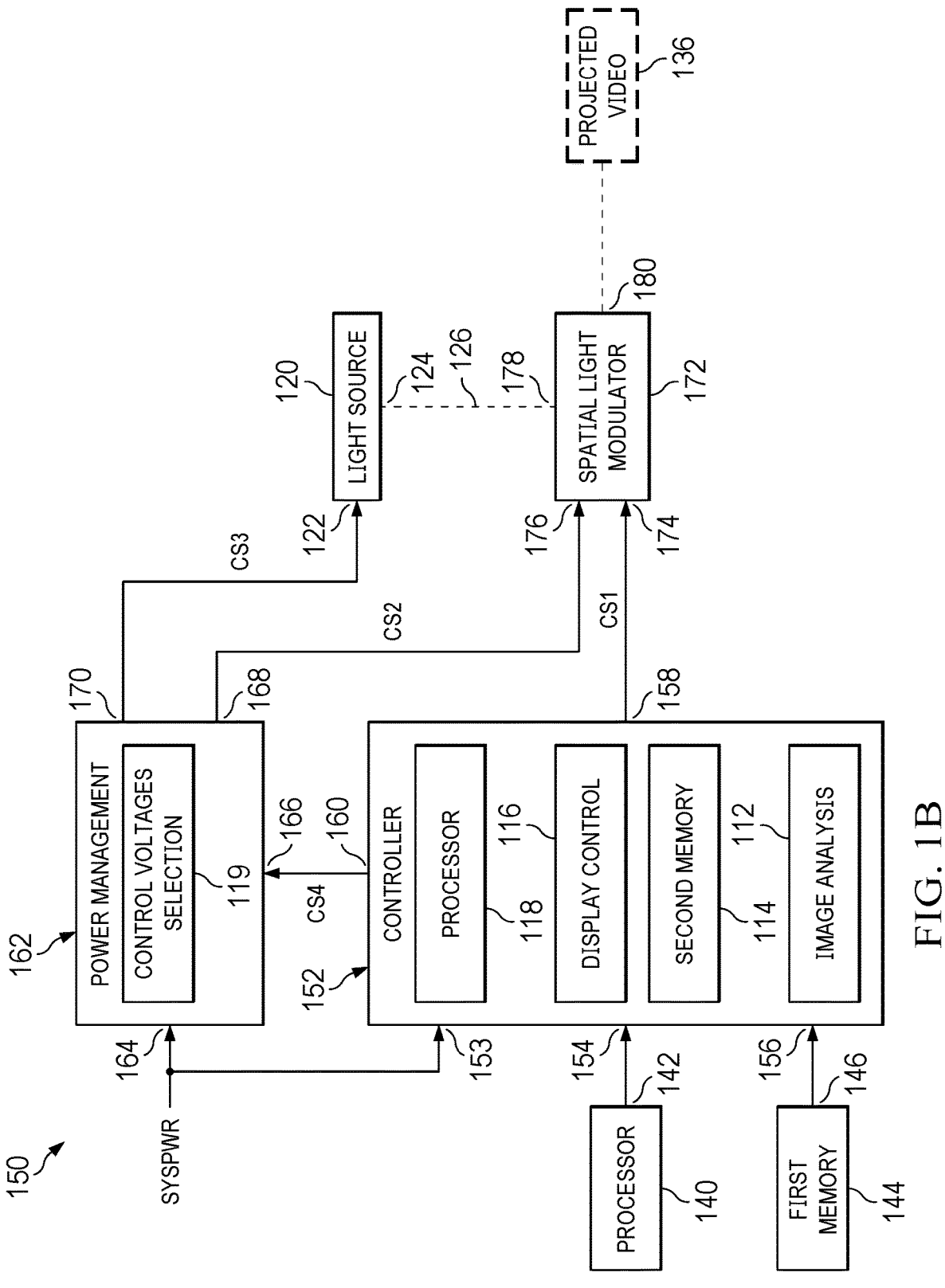
FIG. 1B is a diagram of another system in accordance with various examples.

FIG. 1B is a block diagram of another system 150 in accordance with various examples. As shown, the system 150 includes the light source 120, the processor 140, and the first memory 144 described in FIG. 1A. In the example of the FIG. 1B, the controller 102 of FIG. 1A is replaced by a controller 152 and a power management circuit 162. Also, the SLM 128 is replaced by an SLM 172. The controller 152 has a first terminal 153, a second terminal 154, a third terminal 156, a fourth terminal 158, and a fifth terminal 160. The power management circuit 162 has a first terminal 164, a second terminal 166, a third terminal 168, and a fourth terminal 170. The SLM 172 has a first input 174, a second input 176, an optical input 178, and an optical output 180.

In the example of FIG. 1B, the first terminal 153 of the controller 152 receives SYSPWR or a supply voltage derived from SYSPWR. The second terminal 154 of the controller 152 is coupled to the terminal 142 of the processor 140. The third terminal 156 of the controller 152 is coupled to the terminal 146 of the first memory 144. The fourth terminal 158 of the controller 152 is coupled to the first input 174 of the SLM 172. The fifth terminal 160 of the controller 152 is coupled to the second terminal 166 of the power management circuit 162. The first terminal 164 of the power management circuit 162 receives SYSPWR. In the example of FIG. 1B, both the power management circuit 162 and the controller 152 receive SYSPWR. In other examples, the power management circuit 162 and the controller 152 may receive different supply voltages. The third terminal 168 of the power management circuit 162 is coupled to the second input 176 of the SLM 172. The fourth terminal 170 of the power management circuit 162 is coupled to the input 122 of the light source 120. The optical input 178 of the SLM 172 is coupled to the optical output 124 of the light source 120. The optical output 180 of the SLM 172 provides a projected video 136.

In the example of FIG. 1B, the controller 152 includes the image analysis circuitry 112, the second memory 114, the display control circuitry 116, and the processor 118 described in FIG. 1A. The power management circuit 162 includes the control voltages selection circuitry 119 described in FIG. 1A. In the example of FIG. 1B, the controller 152 performs the operations described for the image analysis circuitry 112, the second memory 114, the display control circuitry 116, and the processor 118 described in FIG. 1A. Responsive to these operations, the controller 152 provides CS1 at its fourth terminal 158 for use by the SLM 172. The controller 152 also provides control signals (CS4) to the power management circuit 162 responsive to the operations of the image analysis circuitry 112, the second memory 114, and the display control circuitry 116. In some examples, CS4 includes the control sequence described herein or illumination control signals derived from the control sequence.

The power management circuit 162 performs the operations described for the control voltages selection circuitry 119. In some examples, the power management circuit 162 is configured to: provide CS2 at its third terminal 168 responsive to the control sequence and the operations of the control voltages selection circuitry 119; and provide CS2 at its fourth terminal 170 responsive to the control sequence and the operations of the control voltages selection circuitry 119.

In some examples, the SLM 172 is configured to provide a projected video 136 responsive to the light 126, CS1, CS2, and CS3. In different examples, the processor 140, the first memory 144, the controller 152, the light source 120, and the SLM 172 are components of a single unit (e.g., a display unit). In other examples, individual components of the system 150 may be distributed into different units (e.g., a display unit, a lighting unit, a control unit, a video generation unit, a video compression unit, a video decompression unit, etc.). Regardless of the particular arrangement of the components for the system 150, the projected video may be based on compressed images and/or decompressed images. In some examples, the SLM 172 includes an LVDS interface or other signaling interface to receive control signals. Without limitation, the SLM 172 may include micromirrors and a two-dimensional array of memory cells. In some examples, the positive or negative deflection angle of micromirrors can be individually controlled by changing the address voltage of underlying memory addressing circuitry and MBRST. In such examples, the SLM 172 receives CS1, CS2, and CS3 through one or more input interfaces and, responsive to CS1, CS2, and CS3, activates the controls which update the mechanical state of the micromirrors. Example SLM components are described in FIGS. 2A and 2B.

Figure 2A:
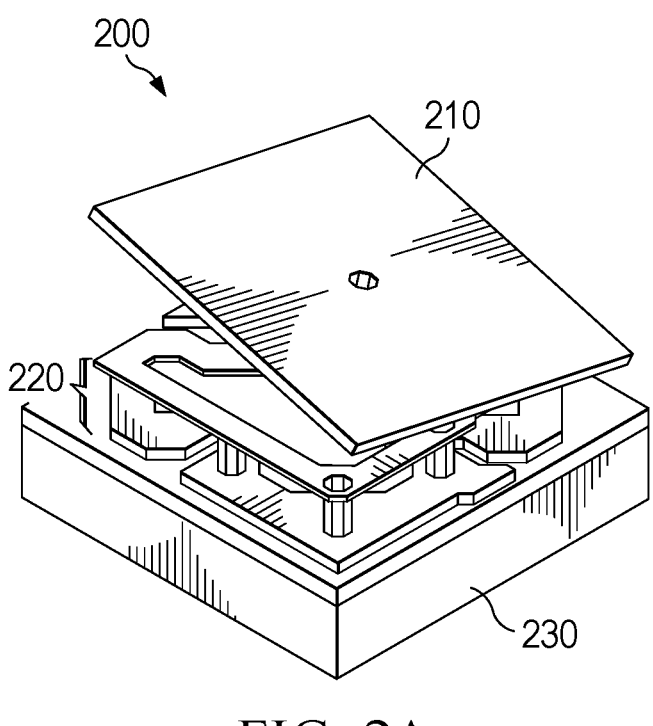
FIG. 2A is a diagram of a spatial light modulator pixel element in accordance with various examples.

FIG. 2A is a diagram of a SLM pixel element 200 in accordance with various examples. The SLM pixel element 200 may be included in a DMD example of the SLM 128 of FIG. 1A or of the SLM 172 of FIG. 1B. In such examples, the SLM pixel element 200 is one of many SLM pixel elements used to display an image. In some examples, an SLM includes an array of pixel elements (e.g., a 1,920×1,080 array of pixel elements or other array size). The array of pixel elements may include, but not limited to, micromirrors, micromirror control elements, and memory cells. In one example, the memory cells are complementary metal-oxide semiconductor (CMOS) static random-access memory (SRAM) memory cells embedded on a semiconductor substrate. In some examples, CS1 provided by the controller 102 or the controller 152 includes data stored in the memory cells of a SLM and used for control operations of each SLM pixel element.

In the example of FIG. 2A, the SLM pixel element 200 includes a micromirror 210, micromirror control elements 220 under the micromirror 210, and a memory cell 230. A load data command, (e.g., included with CS1) writes a memory state such as, for example, a '0' or '1' to the memory cell 230. In one example, a '1' state indicates the micromirror is in an "on" state, which results in the micromirror 210 reflecting light to an optical output (e.g., the optical output 134 in FIG. 1A or the optical output 180 in FIG. 1B). In some examples, the micromirror 210 may be tilted in a positive orientation for the "on" state (e.g., 12 degrees or another positive orientation that tilts the micromirror 210 towards an optical output). Meanwhile, a '0' state may indicate the micromirror 210 is in an "off" state, which results in the micromirror 210 reflecting light away from an optical output. In some examples, the micromirror 210 may be tilted in a negative orientation for the "off" state (e.g., −12 degrees or another negative orientation that tilts the micromirror 210 away from an optical output).

In some examples, a reset data command (e.g., included with CS1) may indicate to the micromirror control elements 220 to change the state of the micromirror 210 from the current state to the memory state stored in the memory cell 230. For example, the reset data command may configure the state of the micromirror 210 to be an "on" state if '1' is written to the memory cell 230.

Figure 2B:
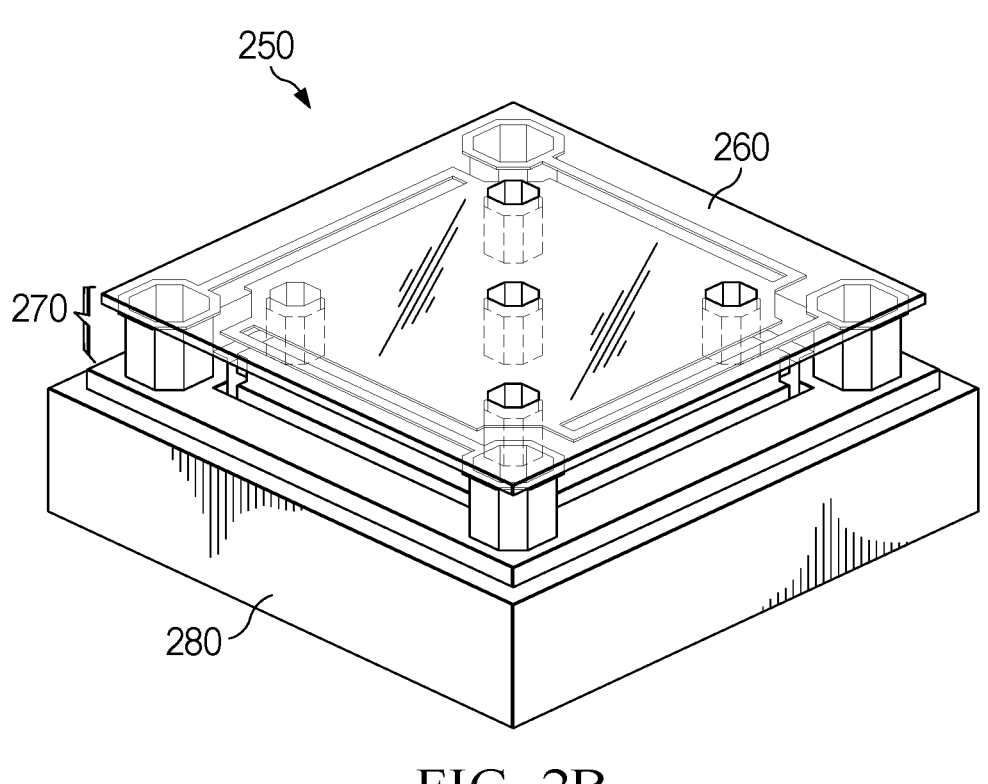
FIG. 2B is a diagram of another spatial light modulator pixel element in accordance with various examples.

FIG. 2B is a diagram of a SLM pixel element 250 in accordance with various examples. The SLM pixel element 250 may be included in a PLM example of the SLM 128 of FIG. 1A or of the SLM 172 of FIG. 1B. In such examples, the SLM pixel element 250 is one of many SLM pixel elements used to display an image. In some examples, an SLM includes an array of pixel elements (e.g., a 1,920×1,080 array of pixel elements or another array size). The array of pixel elements may include, but not limited to, micromirrors, micromirror control elements, and memory cells. In one example, the memory cells are CMOS SRAM memory cells embedded on a semiconductor sub-strate. In some examples, CS1 provided by the controller 102 or the controller 152 includes data stored in the memory cells of a SLM and used for control operations of each SLM pixel element.

In the example of FIG. 2B, the SLM pixel element 250 includes a micromirror 260, micromirror control elements 270 under the micromirror 260, and memory cells 280. In one example, the memory cells 280 include four memory cells, arranged as a 2×2 CMOS SRAM memory cell array. A load data command (e.g., included in CS1) may write a '0' or '1' to the memory cells 280. In the case of four memory cells, there are sixteen memory states. The different memory states may be utilized to improve diffraction efficiency of different wavelengths. The different memory states may be associated with different vertical states of the micromirror 260. A reset data command (e.g., included in CS1) may indicate to the micromirror control elements 270 to change the state of the micromirror 260 from a current state to the memory state written in the memory cells 280. For example, the reset data command may configure the state of the micromirror 260 to be displaced vertically (e.g., moving towards or away from a semiconductor substrate) corresponding to the memory state written in the memory cells 280.

FIG. 3 is a diagram 300 showing alternative control sequence management options 312, 322, and 332 in accordance with various examples. The control sequence management options 312, 322, and 332 of diagram 300 may be performed, for example, by the display control circuitry 116 in FIGS. 1A and 1B. In the diagram 300, the control sequence management options 312, 322, and 332 may include preparatory steps 302, system startup steps 304, and/or runtime steps 306.

In some examples, the control sequence management option 312 includes: the preparatory step 302 of generating and storing sequence segments for all control sequence options at block 314; and the runtime step 306 of generating and executing target sequences based on the stored sequence segments and identified image attributes at block 316. In different examples, the sequence segments stored for block 314 may be stored in the first memory 144 and/or the second memory 114.

In some examples, the control sequence management option 322 includes: the preparatory step 302 of generating and storing complete sequences for all control sequence options at block 324; and the runtime step 306 of selecting target sequences based on identified image attributes, moving the target sequences to memories and/or look up tables (LUTs) of the controller (e.g., the controller 102 in FIG. 1A or the controller 152 in FIG. 1B), and executing the target sequences at block 326. In some examples, the complete sequences stored in block 324 may be stored in the first memory 144. During runtime of the controller, the target sequences of block 326 may be moved from the first memory 144 to the second memory 114 and then executed.

In some examples, the control sequence management option 332 includes: the preparatory step 302 of generating and storing complete sequences for all control sequence options at block 334; the startup step 304 of programming all complete sequences in memories and/or LUTs (e.g., the second memory 114 in FIGS. 1A and 1B) of the controller (e.g., the controller 102 in FIG. 1A or the controller 152 in FIG. 1B); and the runtime step 306 of selecting and executing one of the programmed sequences based on identified image attributes at block 338. In some examples, the complete sequences stored in block 334 may be stored in the first memory 144. At system startup, the complete sequences of block 336 are moved from the first memory 144 to the second memory 114 and programmed. As used herein, programming a complete sequence refers to generating and storing controller executable instructions used to display content on an SLM, to control stages of micromirrors/pixels in sync with illumination, and/or control other active optical components. During runtime of the controller, one of the programmed sequences of block 338 is selected based on identified image attributes and is executed.

The control sequence management options 312, 322, and 332 are just examples. Additionally, or alternatively, control sequence management options may include other preparatory steps 302 such as storing attributes and user preferences. Additionally, or alternatively, control sequence management options may include other system startup steps 304 such as storing configurations used to generate control signals on-the-fly during runtime. Additionally, or alternatively, control sequence management options may include other runtime steps 306 such as generating control signals on-the-fly using a processor (e.g., the processor 118) and/or hardware accelerators.

Each of the control sequence management options 312, 322, and 332 has advantages and disadvantages. The control sequence management option 312 has the advantages of little to no overhead at start-up and the least memory footprint and the disadvantage of slower control sequence switching relative to the control sequence management options 322 and 332. The control sequence management option 312 has the advantage of fastest control sequence switching and the disadvantages of longer processing time at start-up and additional memory compared to the control sequence management options 312 and 332. The control sequence management option 332 has the advantages of faster control sequence switching than the control sequence management options 312 and little to no overhead during start-up. The control sequence management option 332 has the disadvantage of additional memory compared to the control sequence management option 312.

In some examples, the control sequence management option 312 combines pre-generated building blocks (leading, mid or trailing segments) to create a complete control sequence at run-time. In some examples, only unique building blocks are generated for use with the control sequence management option 312. In some examples, the unique building blocks are color agnostic. If programmable sequence instructions are used (e.g., to change SLM reset blocks), the same building blocks may be re-used when a different subset of SLM reset block are updated frame to frame. In some examples, the sequence segments are stitched on the fly depending on the attributes of the current frame by including appropriate sequence components available is controller memories. In different examples, the stitching may be performed using software or hardware. As another option, hardware accelerators programmed by software may be used.

Tables 2 to 5 show example sequence segments and combination options that may be used with the control sequence management option 312.

TABLE 2

| Unique sequence segments |
| --- |
| LS#1 |
| LS#2 |
| MS#1 |
| MS#1, 1A, 1B, 1C |
| MS#2, 2A, 2B, 2C |
| MS#3, 3A, 3B, 3C |
| MS#4, 4A, 4B, 4C |
| TS#1 |
| TS#2 |
| TS#3 |
| TS#4 |
| TS#5 |

TABLE 3

| Component | Color | Stretch factor |
| --- | --- | --- |
| LS#1 | Red | 1.1 |
| LS#2 | Green | 1.2 |
| MS#4 | Red | 1.3 |
| MS#3 | Green | 1.5 |
| MS#1 | Blue | 1.4 |
| TS#3 | Red | 1 |
| TS#1 | Green | 1.1 |
| TS#5 | Blue | 1 |

TABLE 4

| Component | Color | Stretch factor |
| --- | --- | --- |
| LS#2 | Green | 1.3 |
| MS#3 | Green | 1.5 |
| TS#1 | Green | 1 |
| MS#3 | Red | 1.2 |
| TS#3 | Red | 1 |
| MS#1 | Blue | 1.4 |
| TS#5 | Blue | 1 |

TABLE 5

| Component | Color | Stretch factor |
|---|---|---|
| LS#1 | Red | 1.1 |
| LS#2 | Green | 1.2 |
| MS#1B | Red | 1.4 |
| MS#4B | Green | 1.5 |
| MS#3B | Blue | 1.1 |
| TS#3 | Red | 1.2 |
| TS#1 | Green | 1.1 |
| TS#5 | Blue | 1.05 |

Table 2 shows example unique sequence segments. Table 3 shows an example sequence segment for peripheral content. Table 4 shows an example sequence segment for high-bit depth content. Table 5 shows an example sequence segment for different spatial coverage.

Table 6 shows an example control sequence that may be used with the control sequence management options 322 and 332. Table 7 shows example control sequence attributes may be used with the control sequence management options 322 and 332.

TABLE 6

| Index | Component | Color | Stretch factor |
|---|---|---|---|
| 0 | LS#1 | Red | 1.1 |
| 1 | LS#2 | Green | 1.2 |
| 2 | MS#4 | Red | 1.3 |
| 3 | MS#3 | Green | 1.5 |
| 4 | MS#1 | Blue | 1.4 |
| 5 | TS#3 | Red | 1 |
| 6 | TS#1 | Green | 1.1 |
| 7 | TS#5 | Blue | 1 |
| . . . | . . . | . . . | . . . |
| 1017 | LS#2 | Green | 1.3 |
| 1018 | MS#3 | Green | 1.5 |
| 1019 | TS#1 | Green | 1 |
| 1020 | MS#3 | Red | 1.2 |
| 1021 | TS#3 | Red | 1 |
| 1022 | MS#1 | Blue | 1.4 |
| 1023 | TS#5 | Blue | 1 |

TABLE 7

| Bit depth | | | Color cycles | | | Reset block coverage | Start index | Number of entries |
|---|---|---|---|---|---|---|---|---|
| R | G | B | R | G | B | | | |
| 8 | 9 | 7 | 4 | 4 | 4 | 1-8 | 0 | 8 |
| 8 | 9 | 7 | 4 | 4 | 4 | 3-8 | 8 | 8 |
| 8 | 9 | 7 | 4 | 4 | 4 | 5-8 | 16 | 8 |
| . . . | . . . | . . . | . . . | . . . | . . . | . . . | . . . | . . . |
| 7 | 8 | 6 | 1 | 1 | 1 | 1-8 | 1017 | 7 |

In some examples, control sequence options are pre-generated as part of firmware. In such examples, all sequence flavors catering to all features described in Table 1 may be included in the control sequence options. At run-time, software may either program a selected sequence or configure the controller to select a subset (a target sequence flavor) from a previously stored super set responsive to image analysis results. In some examples, control sequence options include pre-generated sequences as a part of firmware. In such examples, all sequence flavors catering to all features described in Table 1 would be included. At run time, software would either program a selected sequence or configure the controller to select a subset (a target sequence flavor) from a previously stored super set responsive to image analysis results.

In some examples, a look-up table (LUT) may be used by software to map sequence entries to the relevant sequence flavors (e.g., the options in Table 1). The LUT may reside in an application processor and may be used to configure the controller at run-time. When only a partial SLM update is necessary, control sequences may either use special instructions that can be configured at run-time to change target SLM blocks or a separate control sequence version may be created for each combination of reset blocks.

Figure 4:
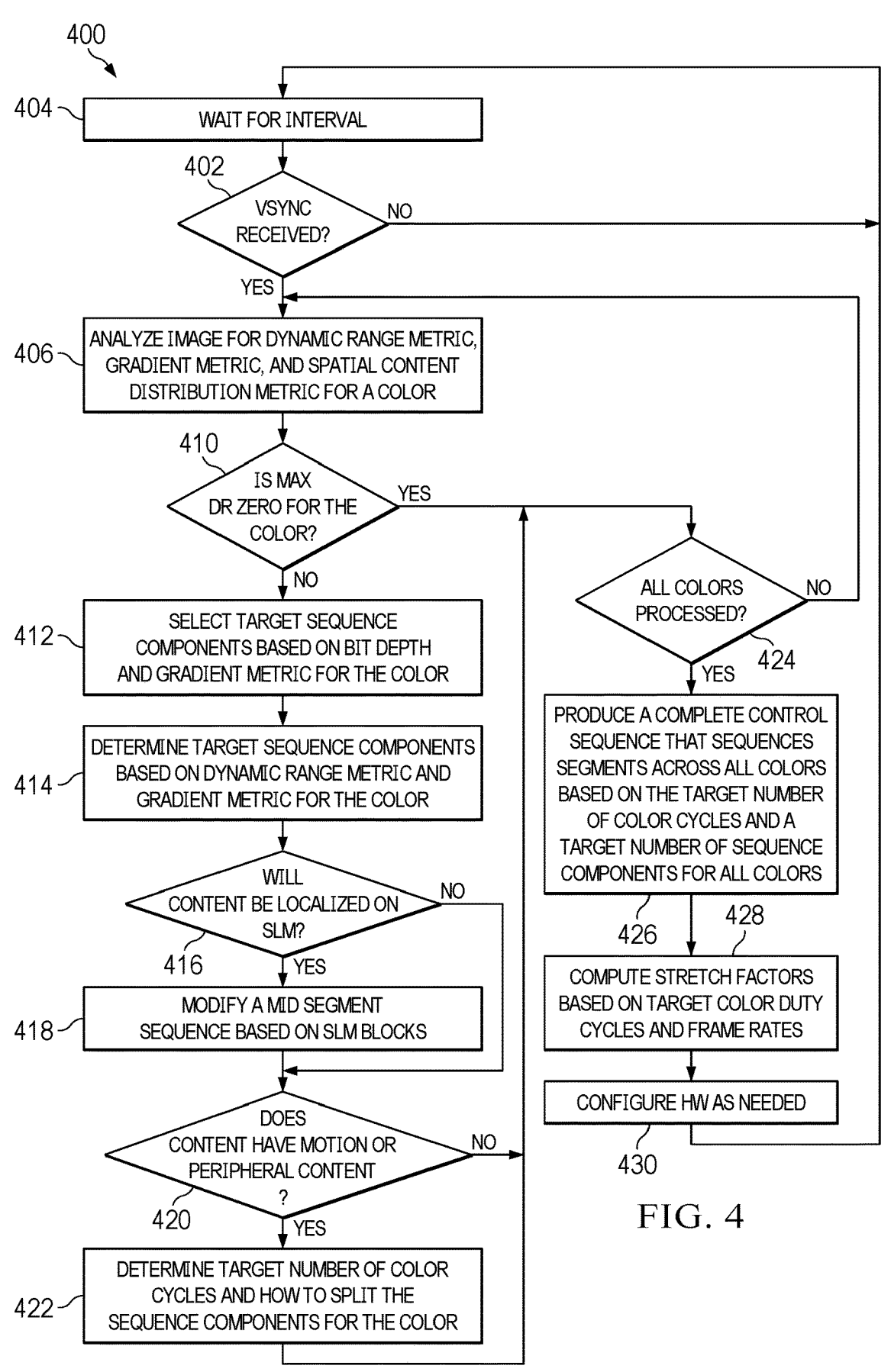
FIG. 4 is a flowchart showing a control method in accordance with various examples.

FIG. 4 is a flowchart showing a control method 400 in accordance with various examples. The control method 400 may be performed, for example, by the controller 102 of FIG. 1A or the controller 152 of FIG. 1B. In the example of FIG. 4, the control method 400 is an example of the control sequence management option 312. More specifically, the control method 400 describes one way to perform the operations of block 316 of the control sequence management option 312. In other examples, the control method 400 may vary with regard to which image attributes used, the order in which image analysis and related response options are performed, and/or other variations.

As shown, the control method 400 includes checking if a sync control signal (Vsync) has been received (block 402). If Vsync has not been received at block 402, the control method 400 waits for an interval at block 404 and then returns to block 402. If Vsync has been received at block 402, an image is analyzed for a dynamic range metric, a gradient metric and spatial content distribution metric for a color at block 406. If a maximum dynamic range for the color is zero (block 410), the control method 400 checks if all colors have been processed at block 424. If not all colors have been processed yet (block 424), the control method 400 returns to block 406. If a maximum dynamic range for the color is not zero (block 410), target sequence components are selected based on bit depth and the gradient metric for the color at block 412. At block 414, target sequence components are determined based on the dynamic range and the gradient metric. If content will be localized on the SLM (block 416), a mid segment sequence is modified based on SLM blocks at block 418. As used herein an "SLM block" refers to a group of one or more rows and/or columns. If content will not be localized on the SLM (block 416), or after the modification of block 418, the control method 400 determines if the content has motion or peripheral content at block 420. If the content the content has motion or peripheral content (block 420), a target number of color cycles and how to split the sequence components are determined for the color at block 422. If the content does not have motion or peripheral content (block 420), or after block 422, the control method 400 returns to block 424. If not all colors have been processed (block 424), the control method 400 returns to block 406. If all colors are processed (block 424), a complete control sequence that sequences segments across all colors is produced at block 426. In some examples, the complete control sequence of block 426 is based on the target number of color cycles (e.g., determined at block 422) and the target number of sequence components (e.g., determined at block 414). At block 428, stretch factors are computed based on target duty cycles and frame rates. At block 430, hardware is configured as needed. In some examples, configuring hardware may include providing software to a processor and/or hardware accelerators for execution (e.g., to generate control signals for an SLM and a light source as described herein). After block 430, the control method 400 returns to block 402 or 404.

Figure 5:
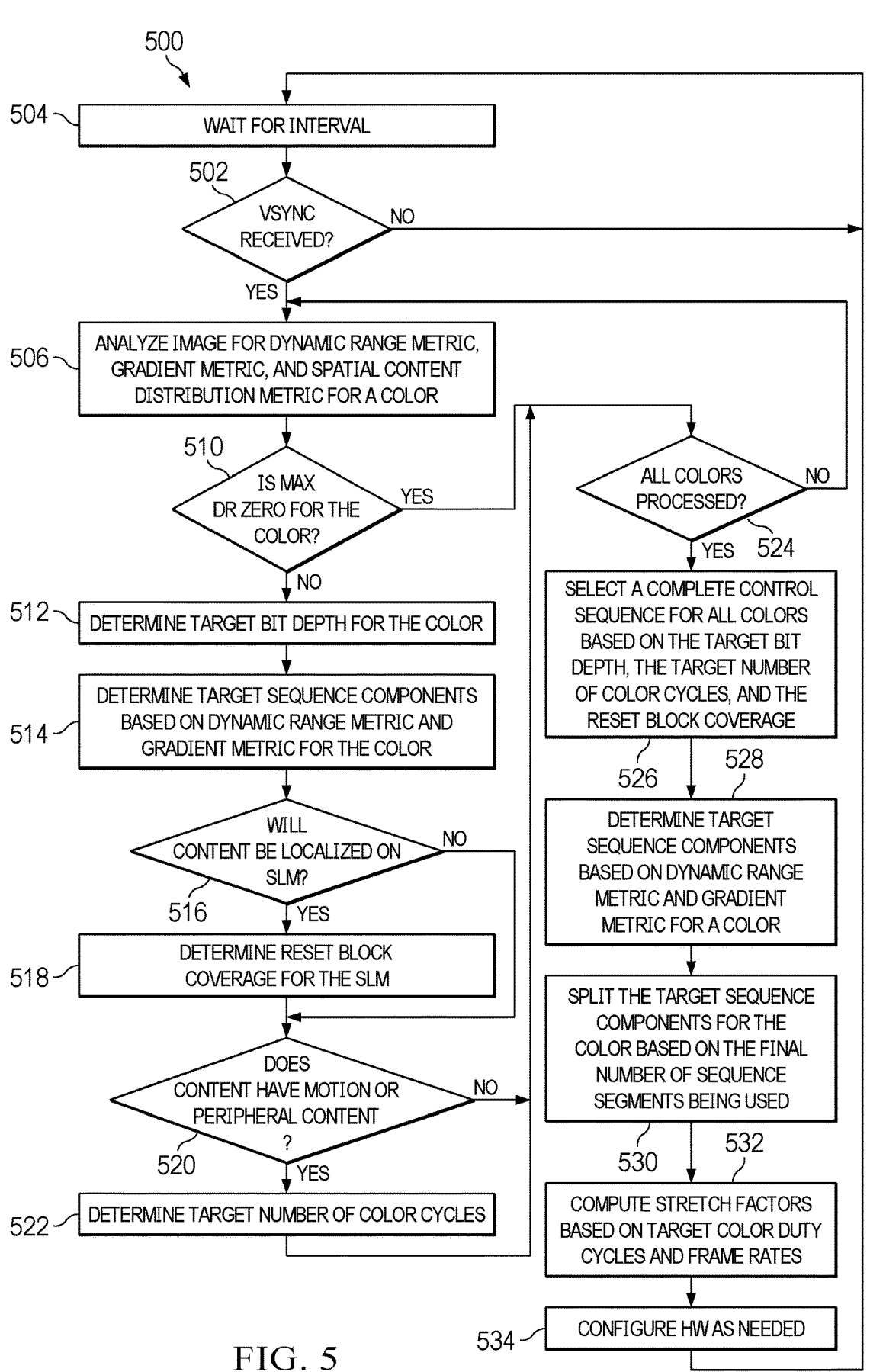
FIG. 5 is a flowchart showing another control method in accordance with various examples.

FIG. 5 is a flowchart showing another control method 500 in accordance with various examples. The control method 500 may be performed, for example, by the controller 102 of FIG. 1A or the controller 152 of FIG. 1B. In the example of FIG. 5, the control method 500 is an example of the control sequence management option 322 or 332. In the example of FIG. 5, the control method 500 is an example of the control sequence management option 312. More specifically, the control method 500 describes one way to perform the operations of block 326 of the control sequence management option 322 or one way to perform the operations of block 338 of the control sequence management option 332. In other examples, the control method 500 may vary with regard to which image attributes used, the order in which image analysis and related response options are performed, and/or other variations.

As shown, the control method 500 includes checking if Vsync has been received (block 502). If Vsync has not been received at block 502, the control method 500 waits for an interval at block 504 and then returns to block 502. If Vsync has been received at block 502, an image is analyzed for a dynamic range metric, a gradient metric, and a spatial content distribution metric for a color at block 506. If a maximum dynamic range for the color is zero (block 510), the control method 500 checks if all colors have been processed at block 524. If not all colors have been processed yet (block 524), the control method 500 returns to block 506. If a maximum dynamic range for the color is not zero (block 510), a target depth for the color is determined at block 512. If content will be localized on an SLM (block 516), reset block coverage for the SLM is determined at block 518. If content will not be localized on an SLM (block 516) or after block 518, the control method 500 proceeds to block 520. If the content has motion or peripheral content (block 520), a target number of color cycles is determined at block 522. If the content has no motion and no peripheral content (block 520) or after block 522, the control method 500 proceeds to block 524. Once all colors are processed (block 524), a complete control sequence for all colors is selected based on the target bit depth (determined at block 512), the target number of color cycles (determined at block 522), and the reset block coverage (determined at block 518) at block 526. At block 528, target sequence components are determined back on a dynamic range metric and a gradient metric for a color. At block 530, the target sequence components for the color are split based on the final number of sequence. At block 532, stretch factors are computed based on target color duty cycles and frame rates. At block 534, hardware is configured as needed based on the complete control sequence produced of block 526, the target sequence components of block 528, the split target sequence components of block 532 and/or the stretch factors of block 534.

FIGS. 6A to 6D are diagrams 600, 610, and 620 showing segments and segment sequences in accordance with various examples. The segments and segment sequences in FIGS. 6A to 6D are example segments and segment sequences that may be stored as unique segments and segment sequences or may be part of a complete control sequence selected or produced using one of the control sequence management options 312, 322, and 332 in FIG. 3. The segments and segment sequences in FIGS. 6A to 6D may correspond to at least some of the example segments and segment sequences in Tables 2 to 6.

Figure 6A:
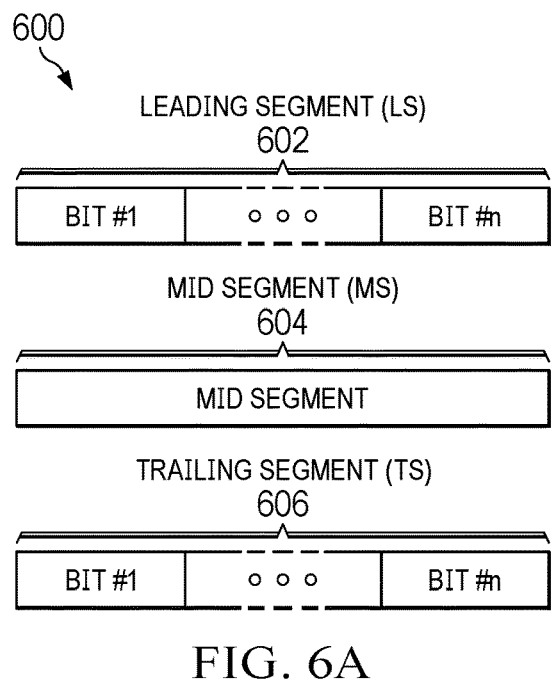
FIGS. 6A to 6D are diagrams showing segments and segment sequences in accordance with various examples.

In the example of FIG. 6A, the diagram 600 includes a leading segment (sometimes "LS" herein) 602, a mid segment (sometimes MS herein) 604, and a trailing segment (sometimes TS herein) 606. The leading segment 602 has n bits and may include one or more global bits. In some scenarios, the leading segment 602 may be impacted by illumination enable delays, illumination rise times, and illumination settling times. In the event of such illumination issues, the increased bit depth benefit of using a leading segment, such as the leading segment 602, is diminished. The mid segment 604 includes bits in the stable part of illumination (where the light intensity is fixed within a target tolerance). In some examples, the bits of the mid segment 604 are targeted towards lower bits and illumination modulation is not used. In some examples, the mid segment 604 uses phased bits to support handling different numbers of reset blocks. As used herein, "phased bits" refers to bits that support partial commands and reset block options for different portions of an SLM (see e.g., the partial display commands, partial clear commands, and partial bit plane data loads in FIG. 9). The trailing segment 606 has n bits and may include one or more global bits. In some scenarios, the trailing segment 606 may be impacted by illumination disable delay and illumination fall times. In the event of such illumination issues, the increased bit depth benefit of using a trailing segment, such as the trailing segment 606, is diminished.

Figure 6B:
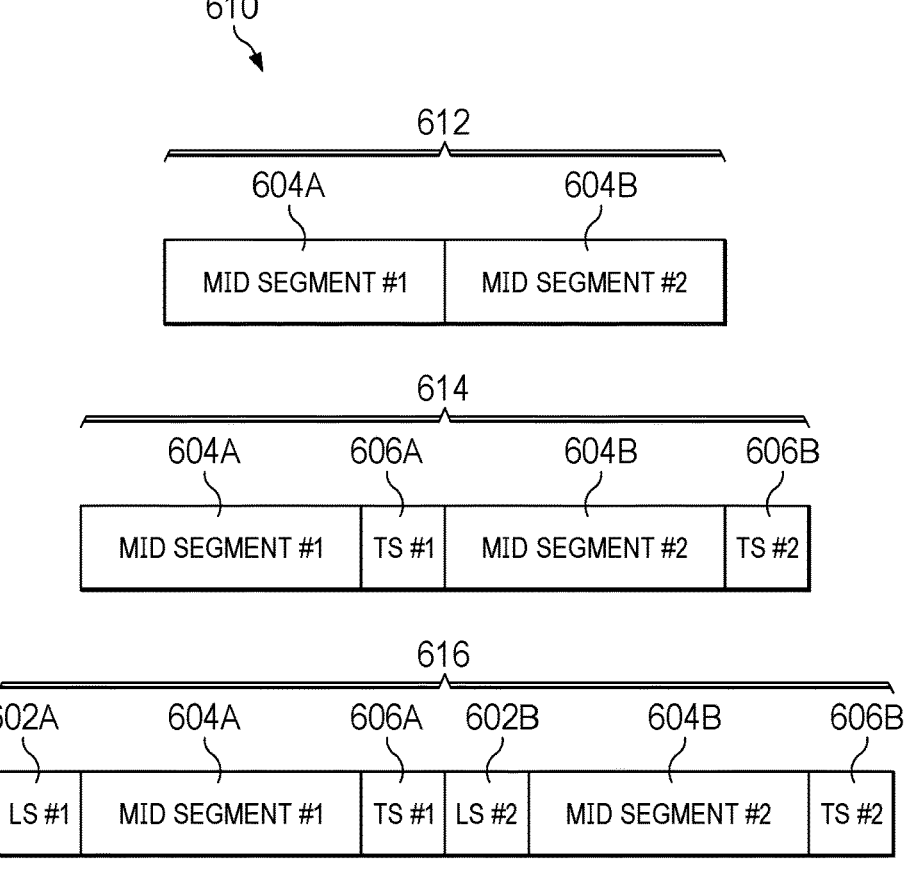

In the example of FIG. 6B, diagram 610 includes example segment sequences 612, 614, and 616. The sequence segments 612, 614, and 616 may be used as building blocks of a control sequence produced or selected using the control sequence management options 312, 322, and 332 in FIG. 3. Each of the sequence segments 612, 614, and 616 may be used or omitted for each color managed by a control sequence.

The segment sequence 612 includes a first mid segment 604A and a second mid segment 604B. The segment sequence 614 includes the first mid segment 604A, a first trailing segment 606A, the second mid segment 604B, and a second trailing segment 606B. The segment sequence 616 includes a first leading segment 602A, the first mid segment 604A, the first trailing segment 606A, a second leading segment 602B, the second mid segment 604B, and the second trailing segment 606B.

Figure 6C:
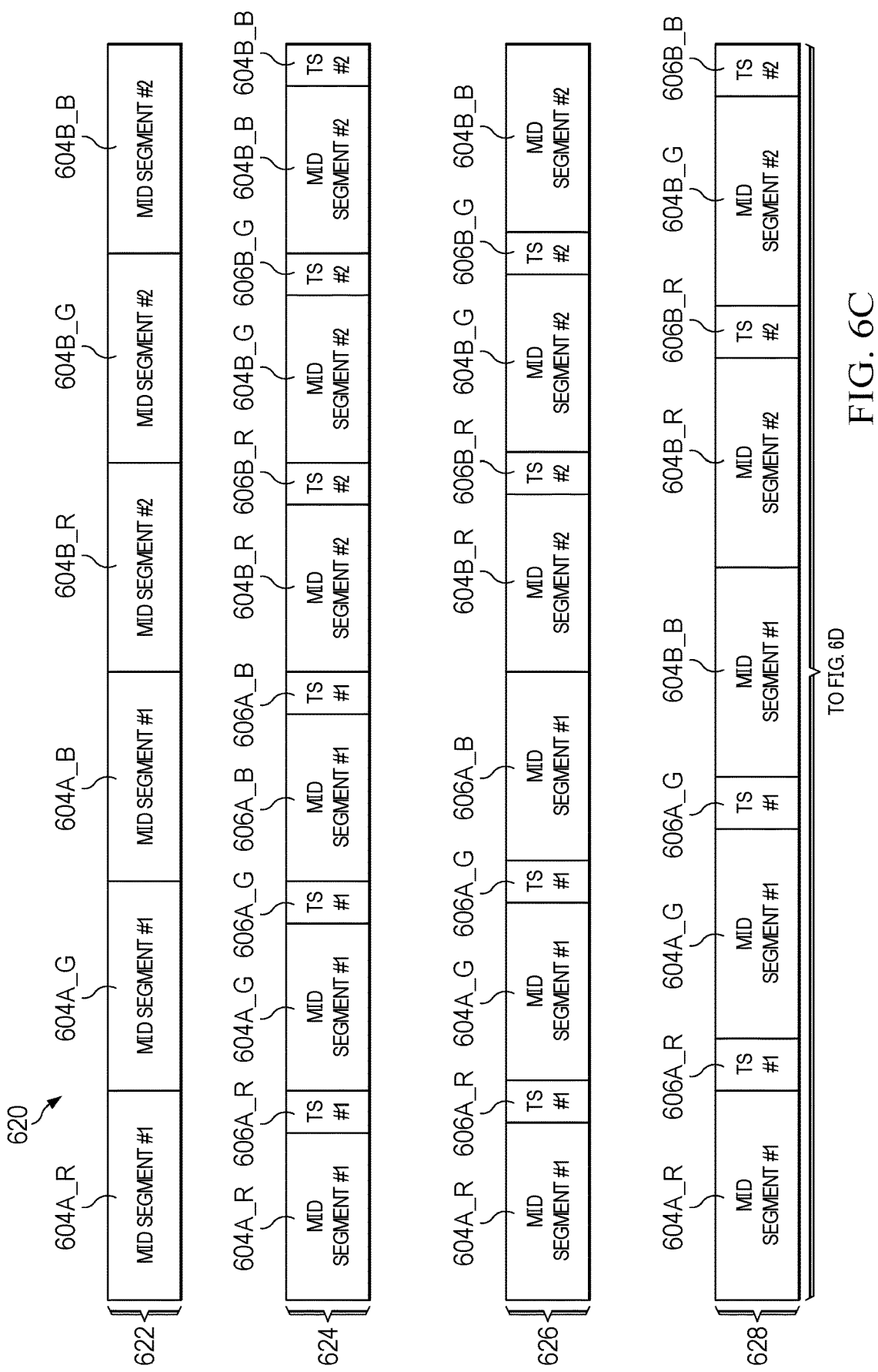
Figure 6D:
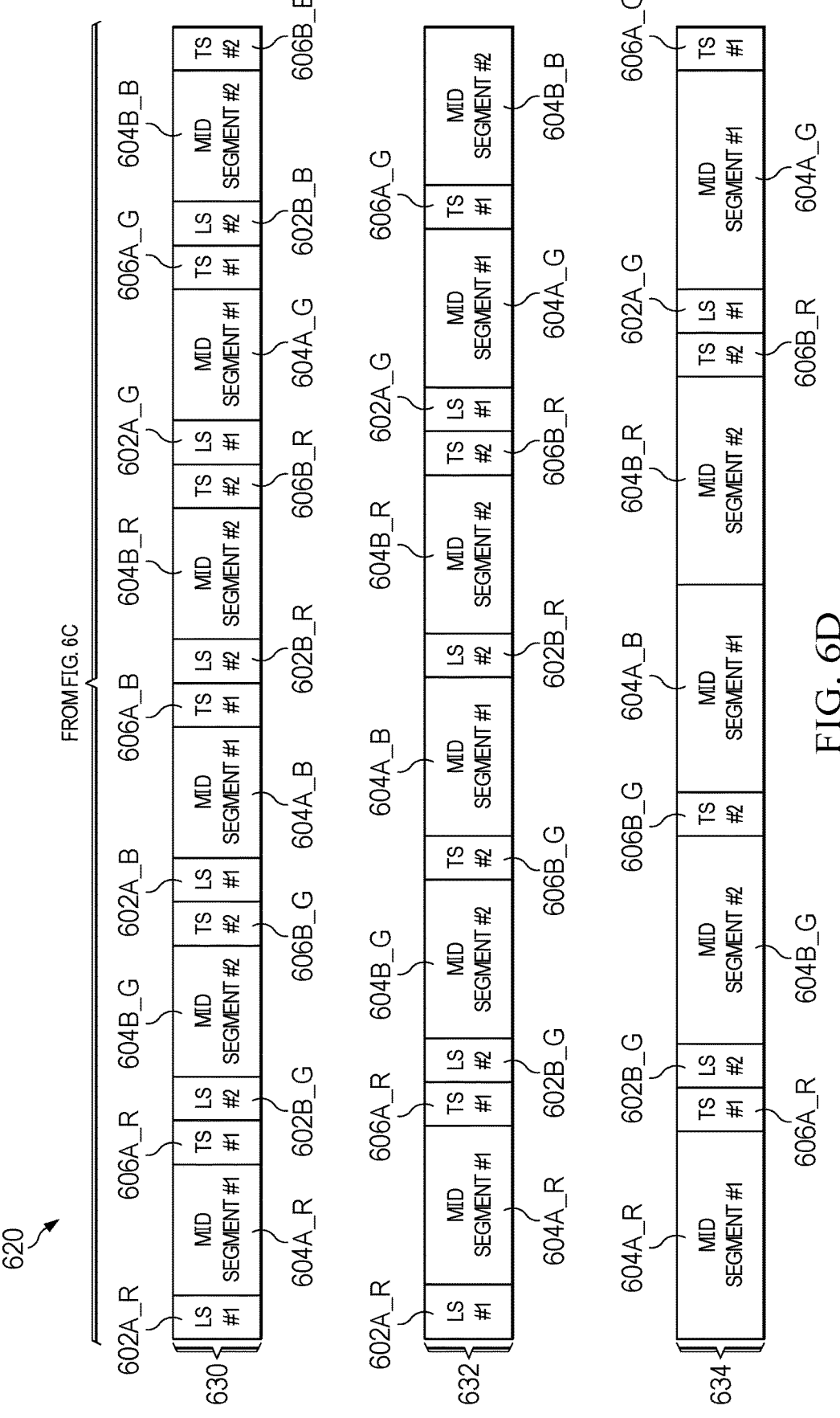

In the example of FIGS. 6C and 6D, diagram 620 includes example segment sequences 622, 624, 626, 628, 630, 632, and 634. The segment sequence 622 includes a first mid segment for red 604A_R, a first mid segment for green 604A_G, a first mid segment for blue 604A_B, a second mid segment for red 604B_R, a second mid segment for green 604B_G, a second mid segment for blue 604B_B. The segment sequence 624 includes the first mid segment for red 604A_R, a first trailing segment for red 606A_R, the first mid segment for green 604A_G, a first trailing segment for green 606A_G, the first mid segment for blue 604A_B, a first trailing segment for blue 606A_B, the second mid segment for red 604B_R, a second trailing segment for red 606B_R, the second mid segment for green 604B_G, a second trailing segment for green 606B_G, the second mid segment for blue 604B_B, and a second trailing segment for blue 606B_B.

The segment sequence 626 is the similar to the segment sequence 624, except the first trailing segment for blue 606A_B and the second trailing segment for blue 606B_B are omitted. The segment sequence 628 is similar to the segment sequence 624, except the first trailing segment for blue 606A_B, the second mid segment for blue 604B_B, and the second trailing segment for blue 606B_B are omitted.

The segment sequence 630 includes a first leading segment for red 602A_R, the first mid segment for red 604A_R, the first trailing segment for red 606A_R, a first leading segment for green 602A_G, the first mid segment for green 604A_G, the first trailing segment for green 606A_G, a first leading segment for blue 602A_B, the first mid segment for blue 604A_B, the first trailing segment for blue 606A_B, a second leading segment for red 602B_R, the second mid segment for red 604B_R, the second trailing segment for red 606B_R, a second leading segment for green 602B_G, the second mid segment for green 604B_G, the second trailing segment for green 606B_G, a second leading segment for blue 602B_B, the second mid segment for blue 604B_B, and the second trailing segment for blue 606B_B.

The segment sequence 632 is similar the segment sequence 630, except the first trailing segment for blue 606A_B and the second trailing segment for blue 606B_B are omitted. The segment sequence 634 is similar to the segment sequence 630, except the first leading segment for red 602A_R, the first leading segment for blue 602A_B, the first trailing segment for blue 606A_B, the second leading segment for red 602B_R, the second leading segment for blue 602B_B, the second mid segment for blue 604B_B, and the second trailing segment for blue 606B_B are omitted.

In different examples, segments or segment sequences such as those described in diagrams 600, 610, and 620 of FIGS. 6A to 6D are selected or combined based on image attributes determined by the image analysis described herein. For example, if the motion metric is above a motion threshold, leading segments and/or trailing segments may be omitted to increase the number of color cycles relative to a default number of color cycles. While omission of leading segments and/or trailing segments reduces bit depth of an image, increasing the color cycles relative to the default number of color cycles can help reduce blur due to motion. As another example, if the dynamic range metric is above a dynamic range threshold, longer versions of a leading segment, a mid segment, and a trailing segment may be used (e.g., the segment sequence 632) to increase bit depth relative to a default bit depth. Table 8 shows relevant relationships between image attributes and sequence segments.

TABLE 8

| Control sequence segments | Image attributes | | | | | |
| --- | --- | --- | --- | --- | --- | --- |
| | Dynamic Range | Shallow Gradient | Content Distribution | Peripheral Content | Hue Profile | Motion |
| LS | May be impacted | May be impacted | No impact | Agnostic | Agnostic | Agnostic |
| MS | No impact | Impacted | Impacted | Agnostic | Agnostic | Agnostic |
| TS | May be impacted | May be impacted | No impact | Agnostic | Agnostic | Agnostic |

In Table 8, the impact of image attributes on control segment sequences is shown. The control segment sequences include a leading segment (LS), a mid segment (MS), and a trailing segment (TS). As shown, a leading segment is: possibly impacted by dynamic range and shallow gradient; not impacted by content distribution; and agnostic to peripheral content, hue profile, and motion. A mid segment is: not impacted by dynamic range; impacted by shallow gradient and content distribution; and agnostic to peripheral content, hue profile, and motion. A trailing segment is: possibly impacted by dynamic range and shallow gradient; not impacted by content distribution; and agnostic to peripheral content, hue profile, and motion.

Figures 7A, 7B:
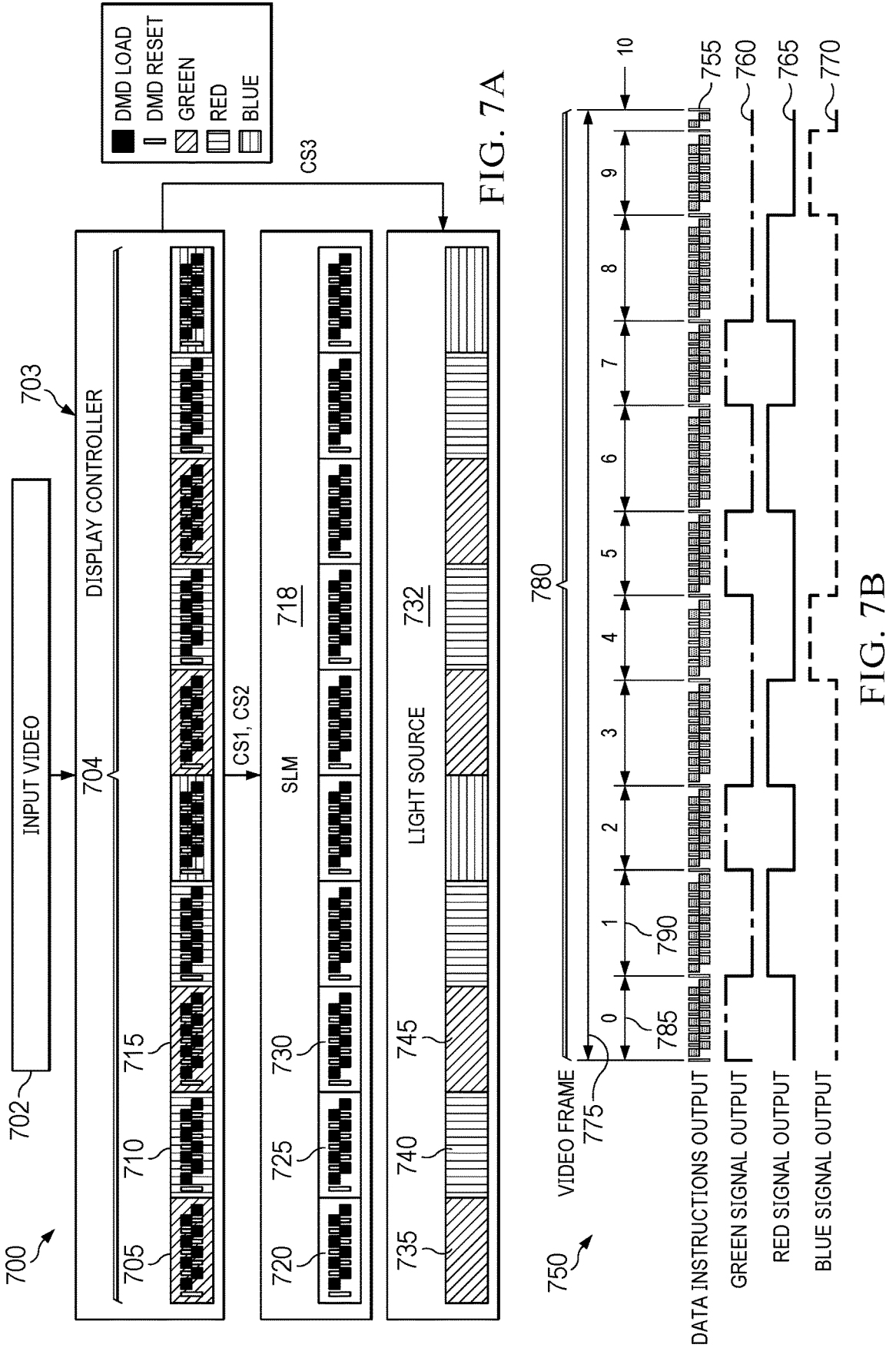
FIG. 7A is a block diagram showing control options in accordance with various examples.
FIG. 7B is a timing diagram showing control signals in accordance with various examples.

FIG. 7A is a block diagram 700 showing control options in accordance with various examples. In the example of FIG. 7A, the block diagram 700 includes input video 702, a display controller 703, a SLM 718, and a light source 732. The display controller 703 is an example of the controller 102 in FIG. 1A or related operations. The SLM 718 is an example of the SLM 128 in FIG. 1A or related operations. The light source 732 is an example of the light source 120 in FIG. 1A or related operations. In FIG. 7, example operations of the display controller 703 and the SLM 718 include DMD load operations and DMD reset operations for red, green, and blue colors. Such DMD load operations and the DMD reset operations are produced by the display controller 703 and conveyed to the SLM 718 as CS1 and CS2.

As shown, the controller 703 produces a control sequence that includes color segments 704, which are associated with sequence segment entries available to the display controller 703. For example, the sequence segment entries may be stored in or moved to memories or LUTs (e.g., the second memory 114 in FIG. 1A) of the display controller 703 for use during runtime. In the example of FIG. 7A, ten color segments are represented including: four color segments of red, four color segments of green, and two color segments of blue. A first color segment 705 corresponds to green and a first time duration, a second color segment 710 corresponds to red and a second time duration, and a third color segment 715 corresponds to green and a third time duration, etc. In different scenarios, the first time duration of the first color segment 705, the second time duration of the second color segment 710, and the third time duration of the third color segment 715 may be the same or different. In different examples, any number of color segments and combination of colors may be defined in a control sequence. Other color options include cyan, magenta, yellow, white, etc. In different examples, the color segments represented in FIG. 7A may be stored in full or in part before runtime and then combined at runtime. As another option, the color segments represented in FIG. 7A may be generated on-the-fly during runtime.

In one example, a first sequence segment corresponding to the first color segment 705 may be stored in the memories or LUTs (e.g., the second memory 114 in FIG. 1A) of the display controller 703, where the first sequence segment is associated with a first value. The first value may indicate the first sequence segment is to be processed and executed first by an execution engine (e.g., part of the display control circuitry 116 in FIG. 1A).

The time duration of the first color segment 705 may be set by associating the first sequence segment with a building block sequence less than or equal to the time duration. For example, a first building block sequence has a time duration of 200 microseconds, a second building block sequence has a time duration of 500 microseconds, a third building block sequence has a time duration of 800 microseconds, etc. If the time duration of the first color segment 705 is 700 microseconds, the second building block sequence may be selected for the first color segment 705. As a result, the first sequence segment is associated with a building block index of a second value, the second value corresponding to the index of the second building block sequence stored in the memories or LUTs (e.g., the second memory 114 in FIG. 1A) of the display controller 703. In different examples, such durations may be controlled for all building blocks together or may be controlled individually (e.g., using clock dropping techniques).

After the building block sequence has been selected, the first sequence segment may be associated with a stretch factor greater than or equal to one. For example, the selected second building block sequence has a time duration of 500 microseconds and the time duration of the first color segment 705 is 700 microseconds. The stretch factor may be "1.4×", indicating 500 microseconds is stretched by 40% to obtain the design time duration of 700 microseconds.

The green color may be achieved by associating the first sequence segment with "G". The value of "G" means the light source 732 will be driven to emit green light for the duration of the first sequence segment. In some examples, the display controller 703 produces CS1, CS2, and CS3 based on color segments such as the color segments 704. In some examples, CS1 and CS2 includes data and signals to configure the SLM 718, while CS3 controls the light source 732. The signals to control the light source 732 may be associated with any color.

In FIG. 7B, the timing diagram 750 includes a representation of data instructions output 755, a green signal output 760, a red signal output 765, and a blue signal output 770 related to the DMD load operations and the DMD reset operations described in FIG. 7A. In some examples, the data instructions output 755, a green signal output 760, a red signal output 765, and a blue signal output 770 are produced for the sequence segments 780 (10 example segments are represented) for a video frame 775. In the timing diagram 750, edges of the data instructions output 755 are shown to be aligned with edges of the green signal output 760, edges of the red signal output 765, and edges of the blue signal output 770. In some examples, such alignment is achieved by accounting for delays in the illumination control signal path and/or delays in the data instructions signal path so that related output signals (or the signals received by an SLM and a light source) are aligned.

In some examples, the display controller 703 issues data instructions including a first set of load data commands and reset data commands 720, a second set of load data commands and reset data commands 725, a third set of load data commands and reset data commands 730, etc. for the SLM 718. For example, the first set of load data commands and reset data commands 720 are based on at least bit segments associated with the first color segment 705 and the input video 702. A first load data command may load first data for half of the SLM 718 and a second load data command may load second data for the other half of the SLM 718 based on the first color segment 705. A first reset data command may configure the SLM 718 at a time after the first data has been loaded to the SLM 718. The first data indicates a configuration for the SLM 718. A second reset data command may configure the SLM 718 at a time after the second data has been loaded to the SLM 718. The second data indicates a configuration for the SLM 718. In the examples of FIGS. 7A and 7B, half of the SLM 718 is loaded while the other half is reset in a repeating pattern. In other examples, data loads and resets may apply to a fourth of the SLM 718 at a time. Alternatively, one reset data command may be issued to apply both the data loaded from the first load data command and the second load data command. In some examples, any combinations of load data commands and reset data commands for the first set of load data commands and reset data commands 720 may be provided. The first set of load data commands and reset data commands 720 corresponds to the first sequence segment 785 portion of the data instructions output 755, the second set of load data commands and reset data commands 725 corresponds to the second sequence segment 790 portion of the data instructions output 755, etc.

In some examples, the display controller 703 provides at least one first signal associated with a first color duration

735, at least one second signal associated with a second color duration 740, at least one third signal associated with a third color duration 745, etc. to a light source controller (e.g., the control voltages selection circuitry 119 in FIG. 1A). For example, the at least one first signal is based on at least the color green associated with the first color segment 705 and the input video 702. Such signals may be included with CS3, which may also control brightness in some examples. The light source controller, in response to receiving the at least one first signal, drives the light source 732 to emit light of green for a first color duration 735 based on at least the green color associated with the first color segment 705. For example, the rising edge for the green signal output 760 drives the light source 732 to emit green light until the falling edge for the green signal output 760. The at least one first signal associated with a first color duration 735 corresponds to the first sequence segment 785 portion of the green signal output 760, the at least one second signal associated with a second color duration 740 corresponds to the second sequence segment 790 portion of the data instructions output 755, etc.

Figure 8A:
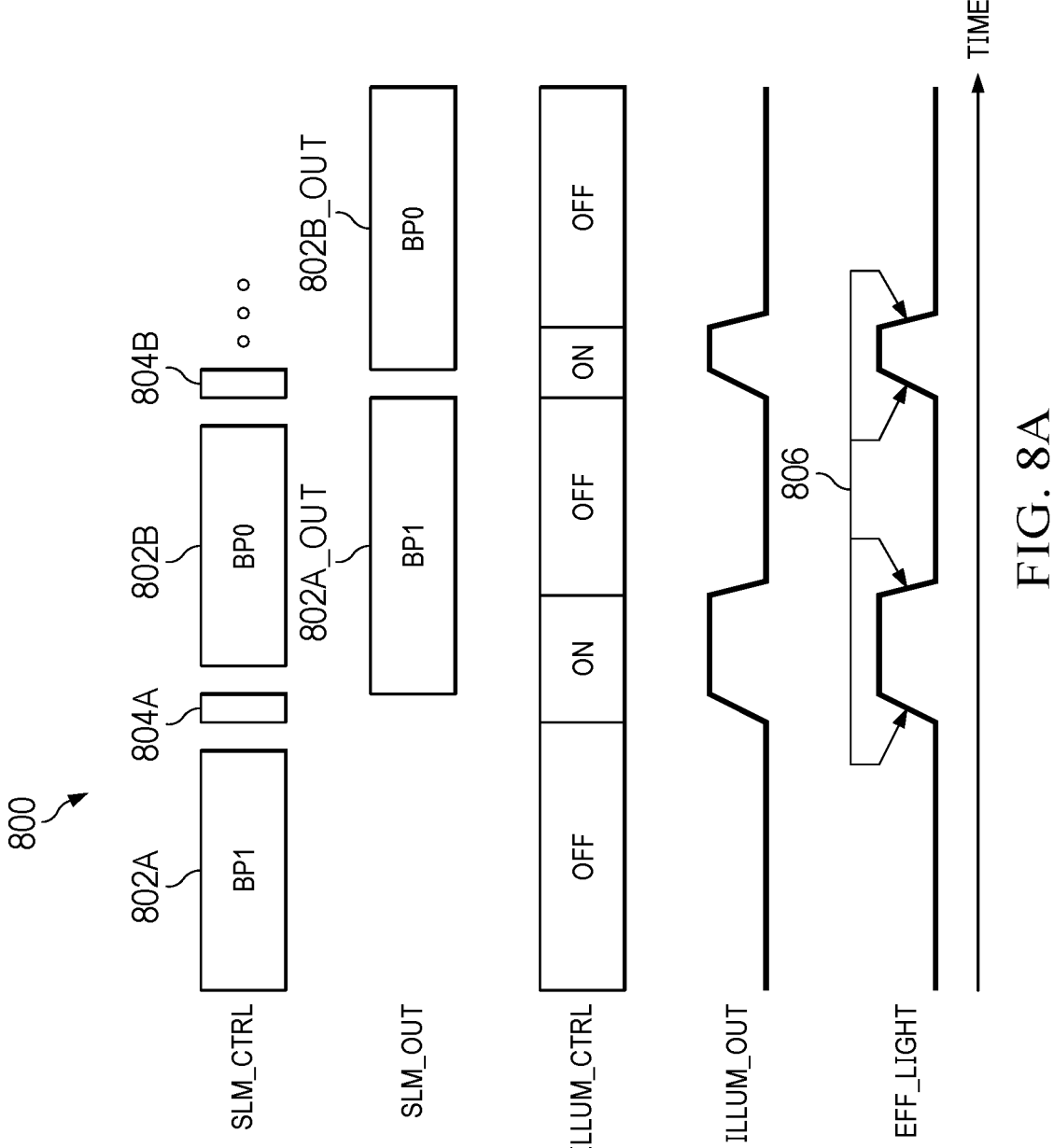
FIGS. 8A and 8B are diagrams showing display-related signals with and without illumination modulation in accordance with various examples.
Figure 8B:
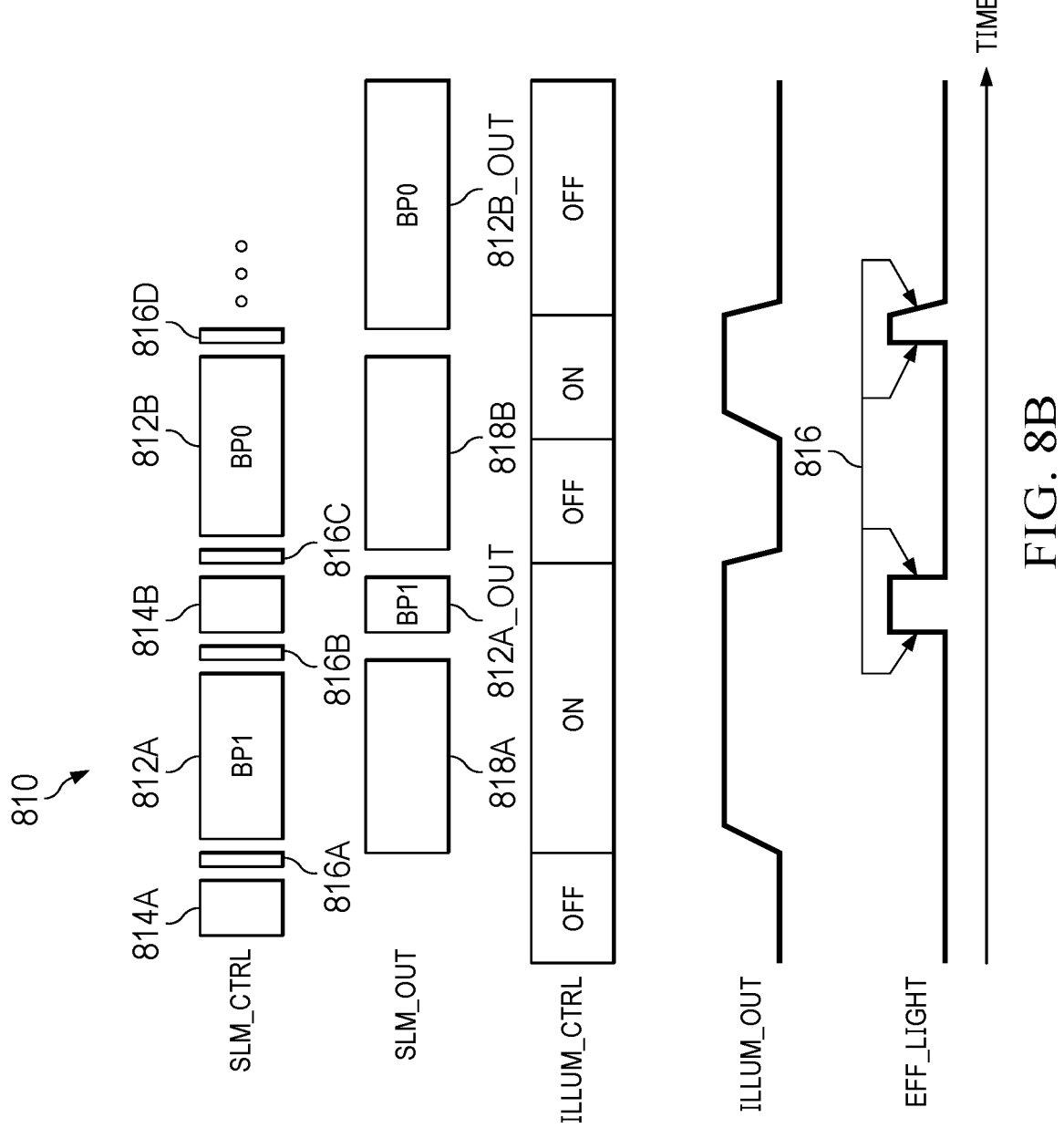

FIGS. 8A and 8B are diagrams 800 and 810 showing display-related signals with and without illumination modulation in accordance with various examples. In FIG. 8A, there is no illumination modulation. In FIG. 8B, there is no illumination modulation. Such illumination modulation is one way to improve power efficiency of a display and it may be combined with the control sequence management based on image analysis results. In the diagram 800, the display-related signals include an SLM control signal (SLM_CTRL), an SLM output (SLM_OUT), an illumination control signal (ILLUM_CTRL), an illumination output (ILLUM_OUT), and effective light (EFF_LIGHT). SLM_CTRL is an example of control signaling included in CS1 in FIGS. 1A, 1B, and 7A. SLM_OUT is the response of an SLM to SLM_CTRL. ILLUM_CTRL is an example of CS3 in FIGS. 1A, 1B, and 7A. EFF_LIGHT is the effective light resulting from an SLM (e.g., the SLM 128 in FIG. 1A, the SLM 172 in FIG. 1B, or the SLM 718 in FIG. 7A) responding to SLM_CTRL with SLM_OUT and from a light source (e.g., the light source 120 in FIGS. 1A and 1B, or the light source 732 in FIG. 7A) responding to ILLUM_CTRL.

In the diagram 800, SLM_CTRL includes bit plane data loads 802A and 802B and related display commands 804A and 804B. Each of the display commands 804A and 804B is a separate command that controls the timing of when a respective bit plane data load is loaded to an SLM. In some examples, the bit plane data loads 802A and 802B are global loads (to the entire SLM). SLM_OUT indicates SLM display operations 802A_OUT and 802B_OUT based on SLM_CTRL. Specifically, in response to the bit plane data load 802A and the display command 804A, SLM_OUT includes SLM display operations 802A_OUT. Later, in response to the bit plane data load 802B and the display command 804A, SLM_OUT includes SLM display operations 802B_OUT. ILLUM_CTRL includes illumination on intervals and illumination off intervals. ILLUM_OUT indicates illumination results from a light source (e.g., the light source 120 in FIGS. 1A and 1B, or the light source 732 in FIG. 7A) based on ILLUM_CTRL. EFF_LIGHT indicates effective light resulting from ILLUM_OUT and SLM_OUT. As shown, EFF_LIGHT includes rising and falling slope portions 806, where less light than expected is provided. With the control technique in diagram 800, illumination irregularities in the rising and falling slope portions 806 in EFF_LIGHT may add inconsistency to some bit times resulting in contouring artifacts.

In the diagram 810, illumination modulation is performed to improve EFF_LIGHT by increasing the slopes of related rising and falling slope portions 816. As shown, the diagram 810 includes SLM_CTRL, SLM_OUT, ILLUM_CTRL, ILLUM_OUT, and EFF_LIGHT. More specifically, SLM_CTRL includes clear SLM commands 814A and 814B, display commands 816A, 816B, 816C, and 816D, and bit plane data loads 812A and 812B. Each of the display commands 816A, 816B, 816C, and 816D is a separate command that controls the timing of when a respective bit plane data load is loaded to an SLM. Each of the clear SLM commands 814A and 814B clears an SLM or SLM portion from a previous bit plane data load. In some examples, the bit plane data loads 812A and 812B are global loads (to the entire SLM). SLM_OUT includes SLM off intervals 818A and 818B, and SLM display operations 812A_OUT and 802B_OUT based on SLM_CTRL. Specifically, the SLM off interval 818A occurs in response to the clear SLM command 814A. Subsequently, in response to the bit plane data load 812A and the display command 816A, SLM_OUT includes SLM display operations 812A_OUT. The SLM off interval 818B occurs in response to the clear SLM command 814B. Subsequently, in response to the bit plane data load 812B and the display command 816B, SLM_OUT includes SLM display operations 812B_OUT. ILLUM_CTRL includes illumination on intervals and illumination off intervals. ILLUM_OUT indicates illumination results from a light source (e.g., the light source 120 in FIGS. 1A and 1B, or the light source 732 in FIG. 7A) based on ILLUM_CTRL. EFF_LIGHT indicates effective light resulting from ILLUM_OUT and SLM_OUT. With the control technique in diagram 810, illumination irregularities in EFF_LIGHT are reduced using the SLM off intervals 818A and 818B as indicated by sharp rising and falling slopes 816 in EFF_LIGHT.

In the diagram 810 of FIG. 8B, delays in the illumination control path are accommodated and the native bit depth for a display is maximized using SLM off intervals. In some examples, image analysis may be used to determine when to apply illumination modulation techniques. As an example, when a dynamic range metric is above a dynamic range threshold and a gradient metric is below a gradient threshold, the illumination modulation techniques described for diagrams 800 and 810 may be used.

Figure 9:
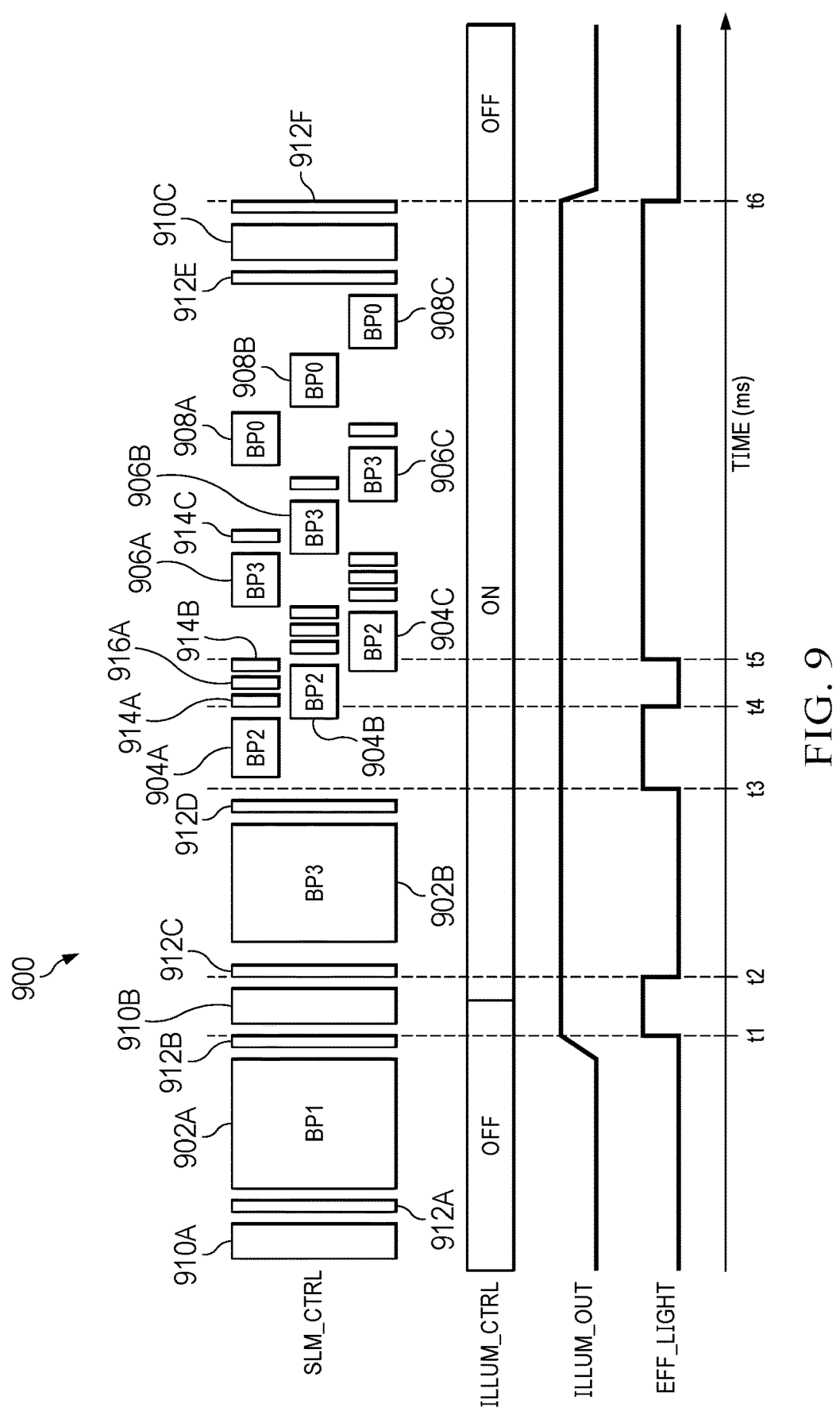
FIG. 9 is a diagram showing display-related signals in accordance with various examples.

FIG. 9 is a diagram 900 showing display-related signals in accordance with various examples. In the diagram 900, the display-related signals include SLM_CTRL, ILLUM_CTRL, ILLUM_OUT, and EFF_LIGHT. In the diagram 900, SLM_OUT is omitted for simplicity. As shown, SLM_CTRL includes clear commands 910A, 910B, and 910C, display commands 912A, 912B, 912C, 912D, 912E, and 912F, and bit plane data loads 902A and 902B. SLM_CTRL also includes partial display commands 914A, 914B and 914C, a partial clear command 916A, and partial bit plane data loads 904A to 904C, 906A to 906C, and 908A to 908C. In diagram 900, the partial display commands and the partial clear command following the partial bit plane data loads 904B and 906B are not labeled but have the same arrangement as the partial display commands 914A, 914B, and 914C, and the partial clear command 916A following the partial bit plane data loads 904A and 906A. Similarly, the partial display commands and the partial clear command following the partial bit plane data loads 904C and 906C are not labeled but have the same arrangement as the partial display commands 914A, 914B, and 914C, and the partial clear command 916A following the partial bit plane data loads 904A and 906A. With partial display commands, partial load commands, and partial clear commands, different portions of an SLM may have data loaded and cleared in a phased or sequential manner. SLM_OUT for FIG. 9, would follow a similar pattern as SLM_OUT for FIG. 8B with global SLM off intervals related to the clear commands 910A, 910B, and 910C, partial SLM off intervals related to the partial clear commands (e.g., the partial clear command 916A and others), and display operations based on global and partial bit plane data loads and related display commands. ILLUM_CTRL includes illumination on intervals and illumination off intervals. ILLUM_OUT indicates illumination results from a light source (e.g., the light source 120 in FIGS. 1A and 1B, or the light source 732 in FIG. 7A) based on ILLUM_CTRL. EFF_LIGHT indicates effective light resulting from ILLUM_OUT and SLM_OUT. With the control technique in diagram 900, illumination irregularities are reduced as indicated by sharp rising and falling slopes in EFF_LIGHT. In some examples, sequences with high bit depth and lower display times may be supported as indicated by the partial bit plane data loads, the partial clear commands, and the partial display commands in the diagram 900. With partial display commands, partial load commands, and partial clear commands, different portions of an SLM may have data loaded and cleared in a phased or sequential manner. In such examples, lower display times may be used while still supporting high bit depth.

In some examples, control sequence management (e.g., for control of a light source and a SLM) has the capability to generate sequence flavors on the fly (either from a compressed universal set or stitching one on the fly) based on one or more image attributes analyzed on a per frame basis. Different control sequence management options may be selected for fastest control sequence switching (with memory overhead) or stitching on the fly for reduced memory footprint. In some examples, a control sequence may be fragmented to enable utilizing partial sequences and to optimize the number of required building blocks or sequence flavors. In some examples, global clears are used to hide illumination irregularities and to provide a scalable solution.

Figure 10:
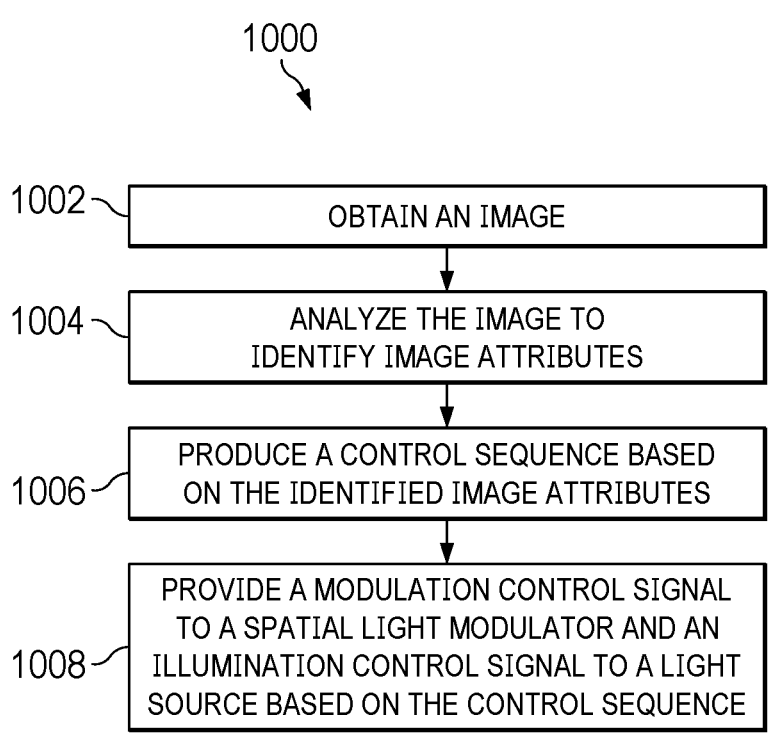
FIG. 10 is a flowchart showing a control method in accordance with various examples.

FIG. 10 is a flowchart showing a control method 1000 in accordance with various examples. The control method 1000 may be part of any of the control sequence management options 312, 322, and 332 described in FIG. 3 or related control methods described in FIGS. 4 and 5. With the control method 1000, a control sequence that includes any of the sequence segments described in FIGS. 6A to 6D, 7A or 7B may be produced. From the control sequence, CS1, CS2, and CS3 are generated. As described herein, CS1 and CS2 are provided to an SLM, while CS3 is provided to a light source. In some examples, the control method 1000 may be combined with the illumination modulation techniques described in FIGS. 8B and 9. The control method 1000 is performed, for example, by the controller 102 of FIG. 1A, the controller 152 and the power management circuit 162 of FIG. 1B, or the display controller 703 in FIG. 7.

As shown, the control method 1000 includes obtaining an image at block 1002. At block 1004, the image is analyzed to identify image attributes. At block 1006, a control sequence is produced based on the identified image attributes. At block 1008, a modulation control signal is provided to an SLM and an illumination control signal is provided to a light source based on the control sequence.

In some examples, a system (e.g., the system includes: an SLM (e.g., the system 100 in FIG. 1A, the system 150 in FIG. 1B, or a related display device); and a controller (e.g., the controller 102 in FIG. 1A, the controller 152 and power management circuit 162 in FIG. 1B, or the display controller 703 in FIG. 7A) coupled to the SLM. The SLM includes pixel elements (e.g., the pixel element 200 in FIG. 2A, the pixel element 250 in FIG. 2B, or another pixel element), wherein the SLM sets the pixel elements based on a modulation control signal. The controller is configured to: obtain an image; analyze the image to determine image attributes including a dynamic range metric; provide a control sequence responsive to the determined image attributes; and provide the modulation control signal to the spatial light modulator based on the control sequence. For example, the modulation control signal reduces a number of bits used by the pixel elements relative to a default number of bits if the dynamic range metric is below a dynamic range threshold.

In some examples, the determined image attributes include a gradient metric (e.g., a spatio-temporal gradient metric), and the modulation control signal reduces a bit depth used by the pixel elements relative to a default bit depth if the gradient metric is below a gradient threshold. In some examples, the determined image attributes include a content distribution metric, and the modulation control signal adjusts reset blocks used by the pixel elements based on the content distribution metric.

In some examples, the system includes a light source (e.g., the light source 120 in FIGS. 1A and 2B, or the light source 732 in FIG. 7A) coupled to the controller, wherein the controller is configured to provide an illumination control signal to the light source based on the control sequence, the illumination control signal excluding at least one color if the dynamic range metric is below the dynamic range threshold. In some examples, the system includes a light source (e.g., the light source 120 in FIGS. 1A and 2B, or the light source 732 in FIG. 7A) coupled to the controller, wherein the determined image attributes include a peripheral content metric, the controller is configured to provide an illumination control signal to the light source based on the control sequence, the modulation control signal reduces reset blocks used by the pixel elements relative to a default number of reset blocks if the peripheral content metric is below a first peripheral content threshold. In such examples, the illumination control signal and the modulation control signal increase a number of color cycles relative to a default number of color cycles if the peripheral content metric is above a second peripheral content threshold. In some examples, the default number of reset blocks used by an SLM refers to the setting used for a previous image. In other examples, the default number of bits used by an SLM refers to a predetermined number of reset blocks used by an SLM based on a user preference, a power setting configuration, and/or an image quality configuration.

In some examples, the system includes a light source (e.g., the light source 120 in FIGS. 1A and 2B, or the light source 732 in FIG. 7A) coupled to the controller, wherein the determined image attributes include a color profile. In such examples, the controller is configured to provide an illumination control signal to the light source based on the control sequence. The illumination control signal and the modulation control signal exclude illumination of at least one color based on the color profile. In some examples, the system includes a light source (e.g., the light source 120 in FIGS. 1A and 2B, or the light source 732 in FIG. 7A) coupled to the controller, wherein the determined image attributes include a motion metric, the controller is configured to provide an illumination control signal to the light source based on the control sequence, and the illumination control signal increases color cycles of the light source relative to a default number of color cycles if the motion metric is above a motion threshold.

In some examples, controller is configured to: access stored sequence segments during a run-time interval; and generate the control sequence based on the stored sequence segments and the determined image attributes, the stored sequence segments including a leading segment for each pixel color, a middle segment for each pixel color, and a trailing segment for each pixel color. In some examples, the system includes a first memory (e.g., the first memory 144 in FIGS. 1A and 1B) coupled to the controller, wherein the controller includes a second memory (e.g., the second memory 114 in FIGS. 1A and 1B) and is configured to: move stored sequences in the first memory to the second memory during a run-time interval; and select one of the stored sequences in the second memory as the control sequence based on the determined image attributes.

In some examples, the system includes a first memory (e.g., the first memory 144 in FIGS. 1A and 1B) coupled to the controller, wherein the controller includes a second memory (e.g., the second memory 114 in FIGS. 1A and 1b) and is configured to: move stored sequences in the first memory to the second memory before a run-time interval; and during the run-time interval, select one of the stored sequences in the second memory as the control sequence based on the determined image attributes.

In some examples, the determined image attributes are first image attributes, the control sequence is a first control sequence, the modulation control signal is a first modulation control signal, and the controller is configured to: obtain a subsequent image; analyze the subsequent image to determine second image attributes; compare the second image attributes with the first image attributes to obtain comparison results; provide a second control sequence responsive to the comparison results; and provide a second modulation control signal to the spatial light modulator based on the second control sequence, the second modulation control signal being partially updated relative to the first modulation control sequence.

In some examples, a method includes: obtaining, by a controller (e.g., the controller 102 in FIG. 1A, the controller 152 and the power management circuit 162 in FIG. 1B, or the display controller 703 in FIG. 7A), an image; analyzing, by the controller, the image to determine image attributes including a peripheral content metric; and providing, by the controller, a modulation control signal responsive to the determined image attributes, the modulation control signal excluding reset blocks for pixels elements of a spatial light modulator if the peripheral content metric is below a peripheral content threshold.

In some examples, the method includes: analyzing the image to determine image attributes including a dynamic range metric and a spatio-temporal gradient metric; and providing the modulation control signal responsive to the determined image attributes, the modulation control signal reducing a number of bits used by the pixel elements relative to a default number of bits if the dynamic range metric is below a dynamic range threshold, and the modulation control signal reducing a bit depth for the pixel elements relative to a default bit depth if the spatio-temporal gradient metric is below a spatio-temporal gradient threshold. In some examples, the peripheral content threshold is a first peripheral content threshold, and the method includes: analyzing the image to determine image attributes including a motion metric; and providing an illumination control signal responsive to the determined image attributes, the illumination control signal increasing color cycles of a light source relative to a default number of color cycles if the peripheral content metric is above a second peripheral content threshold, and the illumination control signal increasing color cycles of a light source relative to a default number of color cycles if the motion metric is above a motion threshold.

In some examples, the method includes: accessing stored sequence segments during a run-time interval of the controller; generating a control sequence based on the stored sequence segments and the determined image attributes; and providing the modulation control signal and a synchronized illumination control signal based on the control sequence. In some examples, the method includes: moving stored sequences from a first memory to a second memory during a run-time interval of the controller; selecting one of the stored sequences in the second memory based on the determined image attributes; and providing the modulation control signal and a synchronized illumination control signal based on the selected sequence.

In some examples, the method includes: moving stored sequences in a first memory to a second memory before a run-time interval of the controller; during the run-time interval of the controller, selecting one of the stored sequences in the second memory based on the determined image attributes; and providing the modulation control signal and a synchronized illumination control signal based on the selected sequence.

In some examples, a device (e.g., an integrated circuit, a circuit, a display, a printed circuit board with circuitry, or other devices) includes a controller (e.g., the controller 102 in FIG. 1A, the controller 152 and the power management circuit 162 in FIG. 1B, or the display controller 703 in FIG. 7A). The controller includes hardware accelerators (e.g., the image analysis circuitry 112 in FIGS. 1A and 1B, and the display control circuitry 116 in FIGS. 1A and 1B) configured to: obtain an image; analyze the image to determine image attributes including a gradient metric; provide a control sequence responsive to the determined image attributes; and provide a modulation control signal based on the control sequence. In some examples, the hardware accelerators are configured to: analyze the image to determine image attributes including a peripheral content metric; provide the control sequence responsive to the determined image attributes; and provide a modulation control signal based on the control sequence, the modulation control signal reducing a bit depth used by pixel elements of a spatial light modulator relative to a depth bit depth if the gradient metric is below a gradient threshold, and the modulation control signal excluding reset blocks for the pixel elements relative to default number of reset blocks if the peripheral content metric is below a peripheral content threshold.

In some examples, the image attribute are first image attributes, and the hardware accelerators are configured to: obtain a subsequent image; analyze the subsequent image to determine second image attributes; compare the second image attributes with the first image attributes to obtain comparison results; provide a second control sequence responsive to the comparison results; and provide a second modulation control signal based on the second control sequence, the second modulation control signal being partially updated relative to the first modulation control sequence.

In different examples, the image attributes may be used individually or together in different combinations to determine a control sequence. The control sequence is used to produce CS1, CS2, and CS3 as described herein to control a light source (e.g., the light source 120 in FIGS. 1A and 1B, or the light source 732 in FIG. 7A) and a SLM (e.g., the SLM 128 in FIG. 1A, the SLM 172 in FIG. 1B, or the SLM 718 in FIG. 7A), resulting in a displayed image. As desired, identifying image attributes to produce a control sequence may be combined with other control features such as illumination modulation and/or SLM control to modify attributes such as native bit depth, color cycles, etc. The resulting control scheme allows a finer degree of control of power consumption for a display based on the images to be displayed.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other examples, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated circuit. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described examples, and other examples are possible, within the scope of the claims.

The invention claimed is:

1. A system comprising:
   a spatial light modulator including pixel elements, wherein the spatial light modulator is configured to control the pixel elements based on a modulation control signal; and
   a controller coupled to the spatial light modulator, wherein the controller is configured to:
   obtain an image;
   analyze the image to determine image attributes including a dynamic range metric that indicates a difference between a lightest area and a darkest area of the image, and at least one of a spatio-temporal gradient metric and a content distribution metric;
   provide a control sequence responsive to the determined image attributes; and
   produce the modulation control signal for the spatial light modulator based on the control sequence, the modulation control signal reducing a number of bits used by the pixel elements relative to a default number of bits if the dynamic range metric is below a dynamic range threshold.

2. The system of claim 1, wherein, when the determined image attributes include the spatio-temporal gradient metric, the modulation control signal reduces a bit depth used by the pixel elements relative to a default bit depth if the spatio-temporal gradient metric is below a gradient threshold.

3. The system of claim 1, wherein, when the determined image attributes include the content distribution metric, the modulation control signal adjusts reset blocks for the pixel elements based on the content distribution metric.

4. The system of claim 1, further comprising a light source coupled to the controller, wherein the controller is configured to provide an illumination control signal to the light source based on the control sequence, the illumination control signal excluding at least one color if the dynamic range metric is below the dynamic range threshold.

5. The system of claim 1, further comprising a light source coupled to the controller, wherein the determined image attributes include a spatial distribution of content metric that indicates relative distribution of content of the image from a peripheral region of the image to a center region of the image, the controller is configured to provide an illumination control signal to the light source based on the control sequence, the modulation control signal reduces reset blocks used by the pixel elements relative to a default number of reset blocks if the spatial distribution of content metric is below a first spatial distribution of content threshold, the illumination control signal and the modulation control signal increasing a number of color cycles relative to a default number of color cycles if the spatial distribution of content metric is above a second spatial distribution of content threshold.

6. The system of claim 1, further comprising a light source coupled to the controller, wherein the determined image attributes include a color profile, the controller is configured to provide an illumination control signal to the light source based on the control sequence, the illumination control signal and the modulation control signal excluding illumination of at least one color based on the color profile.

7. The system of claim 1, further comprising a light source coupled to the controller, wherein the determined image attributes include a motion metric, the controller is configured to provide an illumination control signal to the light source based on the control sequence, the illumination control signal and the modulation control signal increasing a number of color cycles relative to a default number of color cycles if the motion metric is above a motion threshold.

8. The system of claim 1, wherein the controller is configured to:
   access stored sequence segments during a run-time interval; and
   generate the control sequence based on the stored sequence segments and the determined image attributes, the stored sequence segments including a leading segment for each pixel color, a middle segment for each pixel color, and a trailing segment for each pixel color.

9. The system of claim 1, further comprising a first memory coupled to the controller, wherein the controller includes a second memory and the controller is configured to:
   move stored sequences in the first memory to the second memory during a run-time interval; and
   select one of the stored sequences in the second memory as the control sequence based on the determined image attributes.

10. The system of claim 1, further comprising a first memory coupled to the controller, wherein the controller includes a second memory and is configured to:
   move stored sequences in the first memory to the second memory before a run-time interval; and
   during the run-time interval, select one of the stored sequences in the second memory as the control sequence based on the determined image attributes.

11. The system of claim 1, wherein the determined image attributes are first image attributes, the control sequence is a first control sequence, the modulation control signal is a first modulation control signal, and the controller is configured to:
   obtain a subsequent image;
   analyze the subsequent image to determine second image attributes;
   compare the second image attributes with the first image attributes to obtain comparison results;

provide a second control sequence responsive to the comparison results; and provide a second modulation control signal to the spatial light modulator based on the second control sequence, the second modulation control signal being partially updated relative to the first modulation control signal.

12. A method comprising:

obtaining, by a controller, an image;

analyzing, by the controller, the image to determine image attributes including a spatial distribution of content metric that indicates relative distribution of content of the image from a peripheral region of the image to a center region of the image, and at least one of a spatio-temporal gradient metric and a dynamic range metric that indicates a difference between a lightest area and a darkest area of the image; and providing, by the controller, a modulation control signal responsive to the determined image attributes, the modulation control signal excluding reset blocks for pixels elements of a spatial light modulator in response to the spatial distribution of content metric being below a spatial distribution of content threshold.

13. The method of claim 12, wherein the determined image attributes include the dynamic range metric and the spatio-temporal gradient metric, the method further comprising:

producing the modulation control signal responsive to the determined image attributes, the modulation control signal reducing a number of bits used by the pixel elements relative to a default number of bits if the dynamic range metric is below a dynamic range threshold, and the modulation control signal reducing a bit depth for the pixel elements relative to a default bit depth if the spatio-temporal gradient metric is below a spatio-temporal gradient threshold.

14. The method of claim 12, wherein the spatial distribution of content threshold is a first spatial distribution of content threshold, and the method further comprises:

analyzing the image to determine image attributes including a motion metric; and producing an illumination control signal responsive to the determined image attributes, the illumination control signal increasing a number of color cycles of a light source relative to a default number of color cycles if the spatial distribution of content metric is above a second spatial distribution of content threshold, the modulation control signal and the illumination control signal increasing a number of color cycles relative to a default number of color cycles if the motion metric is above a motion threshold.

15. The method of claim 12, further comprising:

accessing stored sequence segments during a run-time interval of the controller;

generating a control sequence based on the stored sequence segments and the determined image attributes; and providing the modulation control signal and a synchronized illumination control signal based on the control sequence.

16. The method of claim 12, further comprising:

moving stored sequences from a first memory to a second memory during a run-time interval of the controller;

selecting one of the stored sequences in the second memory based on the determined image attributes; and producing the modulation control signal and a synchronized illumination control signal based on the selected sequence.

17. The method of claim 12, further comprising:

moving stored sequences in a first memory to a second memory before a run-time interval of the controller;

during the run-time interval of the controller, selecting one of the stored sequences in the second memory based on the determined image attributes; and producing the modulation control signal and a synchronized illumination control signal based on the selected sequence.

18. A controller that includes hardware accelerators, the hardware accelerators configured to:

obtain an image;

analyze the image to determine image attributes including a gradient metric and a spatial distribution of content metric that indicates relative distribution of content of the image from a peripheral region of the image to a center region of the image, including analyze the gradient metric based on a gradient threshold and analyze the spatial distribution of content metric based on a spatial distribution of content threshold;

provide a control sequence responsive to the analysis of the determined image attributes; and provide a modulation control signal based on the control sequence.

19. The controller of claim 18, wherein the hardware accelerators are configured to:

provide the control sequence responsive to the analyzed image attributes; and provide a modulation control signal based on the control sequence, the modulation control signal reducing a bit depth used by pixel elements of a spatial light modulator relative to a default bit depth if the gradient metric is below the gradient threshold, and the modulation control signal excluding reset blocks for the pixel elements relative to a default number of reset blocks if the spatial distribution of content metric is below the spatial distribution of content threshold.

20. The controller of claim 18, wherein the image attributes are first image attributes, the modulation control signal is a first modulation control signal, and the hardware accelerators are configured to:

obtain a subsequent image;

analyze the subsequent image to determine second image attributes;

compare the second image attributes with the first image attributes to obtain comparison results;

provide a second control sequence responsive to the comparison results; and provide a second modulation control signal based on the second control sequence, the second modulation control signal being partially updated relative to the first modulation control signal.

* * * * *